(12) United States Patent
Jonte et al.

(10) Patent No.: US 10,640,878 B2
(45) Date of Patent: May 5, 2020

(54) OZONE GENERATOR FOR A FAUCET

(71) Applicant: Delta Faucet Company, Indianapolis, IN (US)

(72) Inventors: Patrick B. Jonte, Zionsville, IN (US); Michael Scot Rosko, Greenwood, IN (US); Todd Andrew Huffington, Avon, IN (US); Kurt Judson Thomas, Indianapolis, IN (US); Derek Allen Brown, Lizton, IN (US)

(73) Assignee: Delta Faucet Company, Indianapolis, IN (US)

( * ) Notice: Subject to any disclaimer, the term of this patent is extended or adjusted under 35 U.S.C. 154(b) by 392 days.

(21) Appl. No.: 15/336,048

(22) Filed: Oct. 27, 2016

(65) Prior Publication Data
US 2017/0137953 A1    May 18, 2017

Related U.S. Application Data

(60) Provisional application No. 62/254,667, filed on Nov. 12, 2015.

(51) Int. Cl.
| | |
|---|---|
| C25B 1/00 | (2006.01) |
| C25B 9/00 | (2006.01) |
| C25B 9/02 | (2006.01) |
| C25B 15/08 | (2006.01) |
| C25B 9/08 | (2006.01) |
| C25B 11/03 | (2006.01) |
| C25B 1/13 | (2006.01) |
| C25B 9/10 | (2006.01) |
| C25B 15/02 | (2006.01) |

(52) U.S. Cl.
CPC ............... *C25B 15/08* (2013.01); *C25B 1/13* (2013.01); *C25B 9/08* (2013.01); *C25B 9/10* (2013.01); *C25B 11/03* (2013.01); *C25B 15/02* (2013.01)

(58) Field of Classification Search
CPC .... C25B 9/08; C25B 1/00; C25B 9/00; C25B 9/18; C25B 1/13; C25B 9/02
USPC ........................................................ 204/263
See application file for complete search history.

(56) References Cited

U.S. PATENT DOCUMENTS

| | | |
|---|---|---|
| 1,000,206 A | 8/1911 | Spurge |
| 2,778,800 A | 1/1957 | Sheahan |
| 3,653,514 A | 4/1972 | Holler |
| 3,805,481 A | 4/1974 | Armstrong |
| 4,214,962 A | 7/1980 | Pincon |
| 4,352,740 A | 10/1982 | Grader et al. |

(Continued)

FOREIGN PATENT DOCUMENTS

| | | |
|---|---|---|
| CA | 2682361 | 10/2008 |
| CN | 1565960 | 1/2005 |

(Continued)

OTHER PUBLICATIONS

Ozone Generator, www.alibaba.com/product-gs/267935887/small-ozone_generator_water_sterilizer_w . . . , Jun. 11, 2012.

(Continued)

*Primary Examiner* — Zulmariam Mendez
(74) *Attorney, Agent, or Firm* — Faegre Drinker Biddle & Reath LLP

(57) ABSTRACT

An electrolytic ozone generator for use with a faucet and methods for assembling and using the same.

31 Claims, 29 Drawing Sheets

(56) References Cited

U.S. PATENT DOCUMENTS

| | | |
|---|---|---|
| 4,599,166 A | 7/1986 | Gesslauer |
| 4,650,573 A | 3/1987 | Nathanson |
| 4,955,535 A | 9/1990 | Tsutsui et al. |
| 4,971,687 A | 11/1990 | Anderson |
| 5,103,856 A | 4/1992 | Fleischmann |
| 5,173,178 A | 12/1992 | Kawashima et al. |
| 5,199,639 A | 4/1993 | Kobayashi et al. |
| 5,205,994 A | 4/1993 | Sawamoto et al. |
| 5,354,541 A | 10/1994 | Sali |
| 5,368,815 A | 11/1994 | Kasting, Jr. |
| 5,405,631 A | 4/1995 | Rosenthal |
| 5,460,705 A | 10/1995 | Murphy et al. |
| 5,503,890 A | 4/1996 | Jung |
| 5,566,702 A | 10/1996 | Philipp |
| 5,578,280 A | 11/1996 | Kazi et al. |
| 5,635,059 A | 6/1997 | Johnson |
| 5,670,094 A | 9/1997 | Sasaki |
| 5,680,658 A | 10/1997 | Ho |
| 5,728,287 A | 3/1998 | Hough et al. |
| 5,766,462 A | 6/1998 | Jones |
| 5,793,653 A | 8/1998 | Segal |
| 5,803,139 A | 9/1998 | Kennedy |
| 5,807,473 A | 9/1998 | Sadler et al. |
| 5,824,274 A | 10/1998 | Long |
| 5,843,291 A | 12/1998 | Eki et al. |
| 5,843,307 A | 12/1998 | Faivre et al. |
| 5,853,562 A | 12/1998 | Eki et al. |
| 5,858,201 A | 1/1999 | Otsuka et al. |
| 5,858,215 A | 1/1999 | Burchard et al. |
| 5,858,435 A | 1/1999 | Gallo |
| 5,868,311 A | 2/1999 | Cretu-Petra |
| 5,871,701 A | 2/1999 | Long |
| 5,900,143 A | 5/1999 | Dalton et al. |
| 5,911,870 A | 6/1999 | Hough |
| 5,932,171 A | 8/1999 | Malchesky |
| 5,939,030 A | 8/1999 | Moxley |
| 5,945,068 A | 8/1999 | Ferone |
| 5,948,374 A | 9/1999 | Kuzumoto |
| 5,961,920 A | 10/1999 | Soremark |
| 5,979,500 A | 11/1999 | Jahrling et al. |
| 5,985,108 A | 11/1999 | Arai |
| 5,989,407 A | 11/1999 | Andrews |
| 5,992,431 A | 11/1999 | Weber et al. |
| 6,019,950 A | 2/2000 | Lai |
| 6,024,882 A | 2/2000 | McNeilly et al. |
| 6,030,586 A | 2/2000 | Kuan |
| 6,039,884 A | 3/2000 | Burris |
| 6,086,833 A | 7/2000 | Conners |
| 6,110,292 A | 8/2000 | Jewett et al. |
| 6,132,629 A | 10/2000 | Boley |
| 6,135,146 A | 10/2000 | Koganezawa |
| 6,153,151 A | 11/2000 | Moxley |
| 6,171,469 B1 | 1/2001 | Hough et al. |
| 6,217,833 B1 | 4/2001 | Kolu |
| 6,231,769 B1 | 5/2001 | Pean |
| 6,236,953 B1 | 5/2001 | Segal |
| 6,245,229 B1 | 6/2001 | Kool et al. |
| 6,251,172 B1 | 6/2001 | Conrad |
| 6,319,390 B1 | 11/2001 | Kono |
| 6,328,044 B1 | 12/2001 | Crisinel |
| 6,357,727 B1 | 3/2002 | Cho |
| 6,365,026 B1 | 4/2002 | Andrews |
| 6,368,503 B1 | 4/2002 | Williamson et al. |
| 6,375,038 B1 | 4/2002 | Daansen et al. |
| 6,391,191 B2 | 5/2002 | Conrad |
| 6,392,546 B1 | 5/2002 | Smith |
| 6,419,831 B2 | 7/2002 | Wang |
| 6,428,710 B1 | 8/2002 | Kempen et al. |
| 6,431,189 B1 | 8/2002 | Deibert |
| 6,455,017 B1 | 9/2002 | Kasting, Jr. |
| 6,458,257 B1 | 10/2002 | Andrews et al. |
| 6,461,487 B1 | 10/2002 | Andrews |
| 6,482,370 B2 | 11/2002 | Holsclaw et al. |
| 6,491,879 B2 | 12/2002 | Conrad |
| 6,506,309 B1 | 1/2003 | Daniels et al. |
| 6,521,194 B2 | 2/2003 | Yeh |
| 6,523,193 B2 | 2/2003 | Saraya |
| 6,551,490 B2 | 4/2003 | Andrews et al. |
| 6,576,096 B1 | 6/2003 | Andrews |
| 6,581,215 B1 | 6/2003 | Tai |
| 6,585,867 B1 | 7/2003 | Asano |
| 6,595,440 B2 | 7/2003 | Moriarty et al. |
| 6,638,364 B2 | 10/2003 | Harkins et al. |
| 6,645,874 B1 | 11/2003 | Torek et al. |
| 6,652,816 B2 | 11/2003 | Hwang |
| 6,673,248 B2 | 1/2004 | Chowdbury |
| 6,712,951 B2 | 3/2004 | Andrews |
| 6,723,233 B1 | 4/2004 | Barnes |
| 6,727,818 B1 | 4/2004 | Wildman et al. |
| 6,738,996 B1 | 5/2004 | Malek et al. |
| 6,746,580 B2 | 6/2004 | Andrews |
| 6,757,921 B2 | 7/2004 | Esche |
| 6,797,156 B2 | 9/2004 | Chau |
| 6,800,206 B2 | 10/2004 | Robinson |
| 6,808,637 B2 | 10/2004 | Cho |
| 6,814,876 B1 | 11/2004 | Neal |
| 6,821,443 B2 | 11/2004 | Kim |
| 6,860,976 B2 | 3/2005 | Andrews et al. |
| 6,866,806 B2 | 3/2005 | Andrews et al. |
| 6,874,535 B2 | 4/2005 | Parsons et al. |
| 6,882,278 B2 | 4/2005 | Winings et al. |
| 6,964,739 B2 | 11/2005 | Boyd et al. |
| 6,970,574 B1 | 11/2005 | Johnson |
| 6,982,006 B1 | 1/2006 | Boyers et al. |
| 6,984,295 B2 | 1/2006 | Shiue |
| 7,008,523 B2 | 3/2006 | Herrington |
| 7,008,592 B2 | 3/2006 | Sias et al. |
| 7,022,225 B1 | 4/2006 | Clawson et al. |
| 7,029,637 B2 | 4/2006 | Hogarth |
| 7,070,125 B2 | 7/2006 | Williams et al. |
| 7,086,407 B2 | 8/2006 | Lynn |
| 7,087,123 B2 | 8/2006 | Lynn |
| 7,087,124 B2 | 8/2006 | Lynn |
| 7,135,108 B1 | 11/2006 | Barnes |
| 7,150,293 B2 | 12/2006 | Jonte |
| 7,188,632 B2 | 3/2007 | Lynn |
| 7,238,278 B2 | 7/2007 | Coffey et al. |
| 7,244,354 B2 | 7/2007 | Burris |
| 7,275,551 B2 | 10/2007 | Kanaya |
| 7,278,434 B2 | 10/2007 | Huang |
| 7,314,600 B2 | 1/2008 | Matsuzaki |
| 7,322,535 B2 | 1/2008 | Erdely |
| 7,422,684 B1 | 9/2008 | Davis et al. |
| 7,449,090 B2 | 11/2008 | Andrews et al. |
| 7,464,418 B2 | 12/2008 | Seggio et al. |
| 7,488,419 B1 | 2/2009 | Wang et al. |
| 7,494,074 B2 | 2/2009 | Berstead |
| 7,524,466 B2 | 4/2009 | Long |
| 7,531,710 B2 | 5/2009 | Carson et al. |
| 7,537,023 B2 | 5/2009 | Marty et al. |
| 7,542,586 B2 | 6/2009 | Johnson |
| 7,566,387 B2 | 7/2009 | Nam |
| 7,604,735 B1 | 10/2009 | Barnes |
| 7,605,704 B2 | 10/2009 | Munro et al. |
| 7,607,443 B2 | 10/2009 | Barnhill et al. |
| 7,631,372 B2 | 12/2009 | Marty et al. |
| 7,659,824 B2 | 2/2010 | Prodanovich et al. |
| 7,662,293 B2 | 2/2010 | Brolin et al. |
| 7,682,464 B2 | 3/2010 | Glenn et al. |
| 7,690,395 B2 | 4/2010 | Jonte et al. |
| 7,708,958 B2 | 5/2010 | Namespetra |
| 7,722,874 B2 | 5/2010 | Noelle et al. |
| 7,753,074 B2 | 7/2010 | Rosko et al. |
| 7,767,095 B2 | 8/2010 | Phillips et al. |
| 7,767,168 B2 | 8/2010 | Namespetra et al. |
| 7,768,146 B2 | 8/2010 | Balzano |
| 7,818,083 B2 | 10/2010 | Glenn et al. |
| 7,819,136 B1 | 10/2010 | Eddy |
| 7,850,098 B2 | 12/2010 | Vogel et al. |
| 7,875,173 B1 | 1/2011 | Barnes |
| 7,909,269 B2 | 3/2011 | Erickson et al. |
| 7,922,668 B2 | 4/2011 | Rimdzius |
| 7,922,890 B2 | 4/2011 | Sanchez et al. |
| 7,931,813 B2 | 4/2011 | Asokan et al. |

(56) References Cited

U.S. PATENT DOCUMENTS

| | | |
|---|---|---|
| 7,932,618 B2 | 4/2011 | Baarman et al. |
| 7,956,480 B2 | 6/2011 | Onodera et al. |
| 7,956,481 B2 | 6/2011 | Baarman et al. |
| 7,967,800 B2 | 6/2011 | Chewins |
| 7,997,301 B2 | 8/2011 | Marty et al. |
| 8,007,666 B1 | 8/2011 | Davis et al. |
| 8,029,726 B2 | 10/2011 | Resch et al. |
| 8,085,155 B2 | 12/2011 | Prodanovich et al. |
| 8,099,802 B2 | 1/2012 | Yamaguchi et al. |
| 8,110,047 B2 | 2/2012 | Glenn et al. |
| 8,127,782 B2 | 3/2012 | Jonte et al. |
| 8,152,142 B2 | 4/2012 | Hirakui |
| 8,249,295 B2 | 8/2012 | Johnson |
| 8,276,603 B2 | 10/2012 | Berklund et al. |
| 8,294,585 B2 | 10/2012 | Barnhill |
| 8,343,341 B2 | 1/2013 | Davis |
| 8,361,289 B2 | 1/2013 | Whitehead et al. |
| 8,377,229 B2 | 2/2013 | Barnhill et al. |
| 8,400,309 B2 | 3/2013 | Glenn et al. |
| 8,431,006 B2 | 4/2013 | Arihara et al. |
| 8,525,666 B2 | 9/2013 | Melker et al. |
| 8,528,579 B2 | 9/2013 | Jonte et al. |
| 8,545,695 B2 | 10/2013 | Chen et al. |
| 8,734,626 B2 | 5/2014 | Arihara et al. |
| 8,742,932 B2 | 6/2014 | Casares |
| 8,844,564 B2 | 9/2014 | Jonte et al. |
| 8,932,408 B2 | 1/2015 | Sellmer |
| 8,951,477 B2 | 2/2015 | Russell et al. |
| 8,980,079 B2 | 3/2015 | Yost, III et al. |
| 8,999,261 B2 | 4/2015 | Benedetto |
| 9,174,845 B2 | 11/2015 | Lynn |
| 9,303,394 B2 | 4/2016 | Mock et al. |
| 9,340,918 B2 | 5/2016 | Lv et al. |
| 2001/0040133 A1 | 11/2001 | Wang |
| 2002/0019709 A1 | 2/2002 | Segal |
| 2002/0040867 A1 | 4/2002 | Conrad |
| 2002/0048539 A1 | 4/2002 | Mackay |
| 2002/0060189 A1 | 5/2002 | Conrad |
| 2002/0071795 A1 | 6/2002 | Jensen |
| 2002/0130091 A1 | 9/2002 | Ekberg et al. |
| 2002/0134736 A1 | 9/2002 | Burris et al. |
| 2002/0146357 A1 | 10/2002 | Yeh |
| 2003/0080467 A1 | 5/2003 | Andrews et al. |
| 2003/0099584 A1 | 5/2003 | Diang |
| 2003/0108460 A1 | 6/2003 | Andreev et al. |
| 2003/0226751 A1 | 12/2003 | Kasten |
| 2004/0065623 A1 | 4/2004 | Lee |
| 2004/0140269 A1 | 7/2004 | Chang |
| 2005/0000911 A1 | 1/2005 | Thorpe |
| 2005/0103722 A1 | 5/2005 | Freydina et al. |
| 2005/0199484 A1 | 9/2005 | Olstowski |
| 2005/0214182 A1 | 9/2005 | Lu |
| 2005/0279686 A1 | 12/2005 | Hsu |
| 2006/0021923 A1 | 2/2006 | Lin |
| 2006/0051259 A1 | 3/2006 | Chiu |
| 2006/0078661 A1 | 4/2006 | Wang |
| 2006/0053546 A1 | 5/2006 | Gioodt |
| 2006/0108293 A1 | 5/2006 | Brolin et al. |
| 2006/0130907 A1 | 6/2006 | Marty et al. |
| 2006/0151803 A1 | 7/2006 | Wesner et al. |
| 2006/0163169 A1 | 7/2006 | Eckhardt |
| 2006/0186215 A1 | 8/2006 | Logan |
| 2006/0266683 A1 | 11/2006 | Sung |
| 2007/0020212 A1 | 1/2007 | Bernal et al. |
| 2007/0028975 A1 | 2/2007 | Herring et al. |
| 2007/0108135 A1 | 5/2007 | Davis |
| 2007/0125230 A1 | 6/2007 | Powell et al. |
| 2007/0154364 A1 | 7/2007 | Tseng |
| 2007/0204925 A1 | 9/2007 | Bolderheij |
| 2007/0235065 A1 | 10/2007 | Lin |
| 2007/0246564 A1 | 10/2007 | Rodenbeck et al. |
| 2008/0023411 A1 | 1/2008 | Liou |
| 2008/0035580 A1 | 2/2008 | de Rijk |
| 2008/0039176 A1 | 2/2008 | Okada |
| 2008/0067078 A1 | 3/2008 | Kitaori et al. |
| 2008/0105764 A1 | 5/2008 | Jianglin et al. |
| 2008/0156642 A1 | 7/2008 | Fryda et al. |
| 2008/0181832 A1 | 7/2008 | Shiue et al. |
| 2008/0202994 A1 | 8/2008 | Hsu et al. |
| 2008/0203195 A1 | 8/2008 | Schmitt |
| 2008/0237368 A1 | 10/2008 | Hengsperger |
| 2008/0251373 A1 | 10/2008 | Oke |
| 2008/0267840 A1 | 10/2008 | Yeh |
| 2008/0271238 A1 | 11/2008 | Reeder et al. |
| 2009/0039032 A1 | 2/2009 | Patera et al. |
| 2009/0039176 A1 | 2/2009 | Davidson et al. |
| 2009/0113619 A1 | 5/2009 | Tichenor |
| 2009/0114605 A1 | 5/2009 | Salama et al. |
| 2009/0202396 A1 | 8/2009 | Long |
| 2009/0266383 A1 | 10/2009 | Wang |
| 2009/0269240 A1 | 10/2009 | Tanaka |
| 2009/0271238 A1 | 11/2009 | Reeder et al. |
| 2009/0273477 A1 | 11/2009 | Barnhill |
| 2009/0301865 A1 | 12/2009 | Yoshida et al. |
| 2010/0001418 A1 | 1/2010 | Hirakui |
| 2010/0006450 A1 | 1/2010 | Whitehead |
| 2010/0018927 A1 | 1/2010 | Poole |
| 2010/0021598 A1 | 1/2010 | Lynn |
| 2010/0089765 A1 | 4/2010 | Arihara et al. |
| 2010/0100242 A1 | 4/2010 | Frank |
| 2010/0116369 A1 | 5/2010 | Lautzenheiser et al. |
| 2010/0119670 A1 | 5/2010 | Mazzariello |
| 2010/0139779 A1 | 6/2010 | Lautzenheiser et al. |
| 2010/0143201 A1 | 6/2010 | Long |
| 2010/0170570 A1 | 7/2010 | Rodenbeck et al. |
| 2010/0192987 A1 | 8/2010 | Steffen |
| 2010/0193977 A1 | 8/2010 | Yamamoto et al. |
| 2010/0252415 A1 | 10/2010 | Lynn |
| 2010/0320082 A1 | 12/2010 | Kato et al. |
| 2011/0030823 A1 | 2/2011 | Seal et al. |
| 2011/0036761 A1 | 2/2011 | Chen et al. |
| 2011/0068060 A1 | 3/2011 | Hatten |
| 2011/0079519 A1 | 4/2011 | Widler et al. |
| 2011/0175351 A1 | 7/2011 | Baarman et al. |
| 2011/0253220 A1 | 10/2011 | Sawaski et al. |
| 2011/0256027 A1 | 10/2011 | Chen et al. |
| 2011/0316703 A1 | 12/2011 | Butler et al. |
| 2011/0320134 A1 | 12/2011 | Butler et al. |
| 2012/0138478 A1 | 6/2012 | Yost, III et al. |
| 2012/0167926 A1 | 7/2012 | Nakamura |
| 2012/0216828 A1 | 8/2012 | Tanaka et al. |
| 2012/0266983 A1 | 10/2012 | Tsai et al. |
| 2013/0136669 A1 | 5/2013 | Feldain et al. |
| 2013/0146516 A1 | 6/2013 | Chen et al. |
| 2013/0206654 A1 | 8/2013 | Lutz et al. |
| 2013/0269733 A1 | 10/2013 | Chakrabortty et al. |
| 2014/0000733 A1 | 1/2014 | Jonte et al. |
| 2014/0076724 A1 | 3/2014 | Cheng et al. |
| 2014/0251795 A1 | 9/2014 | Chen et al. |
| 2014/0255257 A1 | 9/2014 | Pawlow |
| 2014/0322096 A1 | 10/2014 | Pelfrey et al. |
| 2014/0352799 A1 | 12/2014 | Rosko et al. |
| 2015/0059085 A1 | 3/2015 | Seibt |
| 2015/0157754 A1 | 6/2015 | Rutter et al. |
| 2015/0191381 A1 | 7/2015 | Wang |
| 2015/0197432 A1 | 7/2015 | Widler et al. |
| 2015/0308084 A1 | 10/2015 | Thompson et al. |
| 2015/0376804 A1 | 12/2015 | Gorokhovsky et al. |
| 2016/0220714 A1 | 8/2016 | Weltmann et al. |
| 2018/0171491 A1* | 6/2018 | Jonte ..................... C01B 13/11 |

FOREIGN PATENT DOCUMENTS

| | | |
|---|---|---|
| CN | 1675435 | 9/2005 |
| CN | 1809655 A | 7/2006 |
| CN | 101137797 | 3/2008 |
| CN | 101448744 | 6/2009 |
| CN | 101509576 | 8/2009 |
| CN | 102671559 | 9/2012 |
| CN | 103328690 | 9/2013 |
| CN | 103987664 | 8/2014 |
| EP | 0 544 744 | 6/1991 |
| EP | 1149054 | 3/2003 |
| EP | 1841924 | 10/2007 |

(56) References Cited

FOREIGN PATENT DOCUMENTS

| | | | |
|---|---|---|---|
| JP | 6306666 A | 11/1994 | |
| JP | 7060265 | 3/1995 | |
| JP | 7290073 | 11/1995 | |
| JP | 8071566 | 3/1996 | |
| JP | 8108017 | 4/1996 | |
| JP | 8281281 | 10/1996 | |
| JP | 9075958 | 3/1997 | |
| JP | 10005148 | 1/1998 | |
| JP | 10219786 | 8/1998 | |
| JP | 10328274 | 12/1998 | |
| JP | 11009481 | 1/1999 | |
| JP | 11021960 | 1/1999 | |
| JP | 11036394 | 2/1999 | |
| JP | 11047773 | 2/1999 | |
| JP | 11047774 | 2/1999 | |
| JP | 11140929 | 5/1999 | |
| JP | 11157808 | 6/1999 | |
| JP | 11236692 | 8/1999 | |
| JP | 11247258 | 9/1999 | |
| JP | 2000197891 | 7/2000 | |
| JP | 2000317474 | 11/2000 | |
| JP | 2011004990 | 1/2001 | |
| JP | 2001040731 | 2/2001 | |
| JP | 2001070770 | 3/2001 | |
| JP | 2001205059 | 7/2001 | |
| JP | 2001276666 | 10/2001 | |
| JP | 2002052327 | 2/2002 | |
| JP | 2002126481 | 5/2002 | |
| JP | 2002331233 | 11/2002 | |
| JP | 2003135944 | 5/2003 | |
| JP | 2003247255 | 9/2003 | |
| JP | 2003320278 | 11/2003 | |
| JP | 2004084445 | 3/2004 | |
| JP | 2004324190 | 11/2004 | |
| JP | 2005021718 | 1/2005 | |
| JP | 2005124797 | 5/2005 | |
| JP | 2005131489 | 5/2005 | |
| JP | 2005169297 | 6/2005 | |
| JP | 2006136862 | 6/2006 | |
| JP | 2007111689 | 5/2007 | |
| JP | 2007236706 | 9/2007 | |
| JP | 2008000666 | 1/2008 | |
| JP | 2008018327 | 1/2008 | |
| JP | 2008086960 | 4/2008 | |
| JP | 2008229491 | 10/2008 | |
| JP | 2009189279 | 8/2009 | |
| JP | 2009209378 | 9/2009 | |
| JP | 2010090586 | 4/2010 | |
| JP | 2010150630 | 7/2010 | |
| KR | 199614038 | 10/1996 | |
| KR | 2009027908 | 3/2009 | |
| KR | 2009030783 | 3/2009 | |
| KR | 20090086962 | 8/2009 | |
| KR | 1026415 | 4/2011 | |
| TW | 586920 | 5/2004 | |
| TW | 200516060 | 2/2005 | |
| TW | 200516060 | 5/2005 | |
| TW | M270172 | 7/2005 | |
| TW | M323278 | 12/2007 | |
| TW | 201117887 | 6/2011 | |
| TW | 201350624 | 12/2013 | |
| WO | WO 98/16473 | 4/1998 | |
| WO | WO 1999012084 | 3/1999 | |
| WO | WO 00/35813 | 6/2000 | |
| WO | WO0133529 | 5/2001 | |
| WO | WO 2002014226 | 2/2002 | |
| WO | WO 2002021475 | 3/2002 | |
| WO | WO 03/040032 | 5/2003 | |
| WO | WO 03/068375 | 8/2003 | |
| WO | WO03079278 | 9/2003 | |
| WO | WO 2003079278 | 9/2003 | |
| WO | WO 2003033402 | 11/2003 | |
| WO | WO 2004/033376 | 4/2004 | |
| WO | WO2005/054545 | 6/2005 | |
| WO | WO 2006/076149 | 7/2006 | |
| WO | WO2006/096991 | 9/2006 | |
| WO | WO 2008/044262 | 4/2008 | |
| WO | WO 2009028845 | 3/2009 | |
| WO | WO2010/011887 | 1/2010 | |
| WO | WO2010/099397 | 9/2010 | |
| WO | WO2010/104564 | 9/2010 | |
| WO | WO2011/144285 | 11/2011 | |
| WO | 2012075425 A2 | 6/2012 | |
| WO | WO2013/045508 | 4/2013 | |
| WO | WO2013/086217 | 6/2013 | |
| WO | WO2014/113699 | 7/2014 | |
| WO | WO2016/112922 | 6/2016 | |
| WO | 2017011506 A1 | 1/2017 | |

OTHER PUBLICATIONS

Ozone Boy, www.cleanwaterstore.com/OS001630-p-ozone-faucet.html; Jun. 11, 2012.
Medi-Flo$_3$ Sink, available at www.franke-commercial.com, available at least as early as Nov. 27, 2015, 1 page.

* cited by examiner

OZONE GENERATOR FOR A FAUCET

CROSS-REFERENCE TO RELATED APPLICATION

The present application claims priority to U.S. Provisional Patent Application Ser. No. 62/254,667, filed Nov. 12, 2015, the disclosure of which is expressly incorporated herein by reference.

FIELD OF THE DISCLOSURE

The present disclosure relates to an ozone generator. More particularly, the present disclosure relates to an electrolytic ozone generator for use with a faucet, and to methods for assembling and using the same.

BACKGROUND AND SUMMARY OF THE DISCLOSURE

An electrolytic ozone generator may be used to produce ozone in water. The ozone may perform a beneficial disinfecting function by destroying bacteria and pathogens in the water or surfaces it contacts. However, existing ozone generators are often difficult to assemble, repair, have limited life, and may suffer from low water flow or reduced dissolved ozone concentration The present disclosure provides an electrolytic ozone generator for use with a faucet and to methods for assembling and using the same.

According to an illustrative embodiment of the present disclosure, an ozone generator is provided for use with a faucet, the ozone generator including an outer cartridge and an electrolytic cell assembly received within the outer cartridge. The electrolytic cell assembly includes a first housing, an anode coupled to the first housing, a second housing, a cathode coupled to the second housing, a separator positioned between the anode and the cathode, and a holder that couples the first housing to the second housing independently of the outer cartridge.

According to another illustrative embodiment of the present disclosure, an ozone generator is provided for use with a faucet, the ozone generator including a first housing, a first current spreader overmolded by the first housing, an anode in electrical communication with the first current spreader, a second housing, a second current spreader overmolded by the second housing, a cathode in electrical communication with the second current spreader, and a separator between the anode and the cathode.

According to a further illustrative embodiment of the present disclosure, an ozone generator system for use with a faucet includes a mixing valve having a cold water inlet fluidly coupled to a cold water source, a hot water inlet fluidly coupled to a hot water source, and an outlet in selective fluid communication with the cold water inlet and the hot water inlet, and a valve body having a first valve receiving chamber, a second valve receiving chamber, and an ozone generator receiving chamber, and an outlet passageway. The ozone generator system further includes an ozone generator received within the ozone generator receiving chamber, a first electrically operable valve received within the first valve receiving chamber and configured to control water flow from the outlet of the mixing valve to the outlet passageway of the valve body, and a second electrically operably valve received within the second valve receiving chamber and configured to control water flow from the cold water source to the ozone generator.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

An exemplary ozone generator 100 of the present disclosure is shown in FIGS. 1-4. The illustrative ozone generator 100 has an inlet end 102, an outlet end 104, and a longitudinal axis L extending therebetween.

Figure 1:
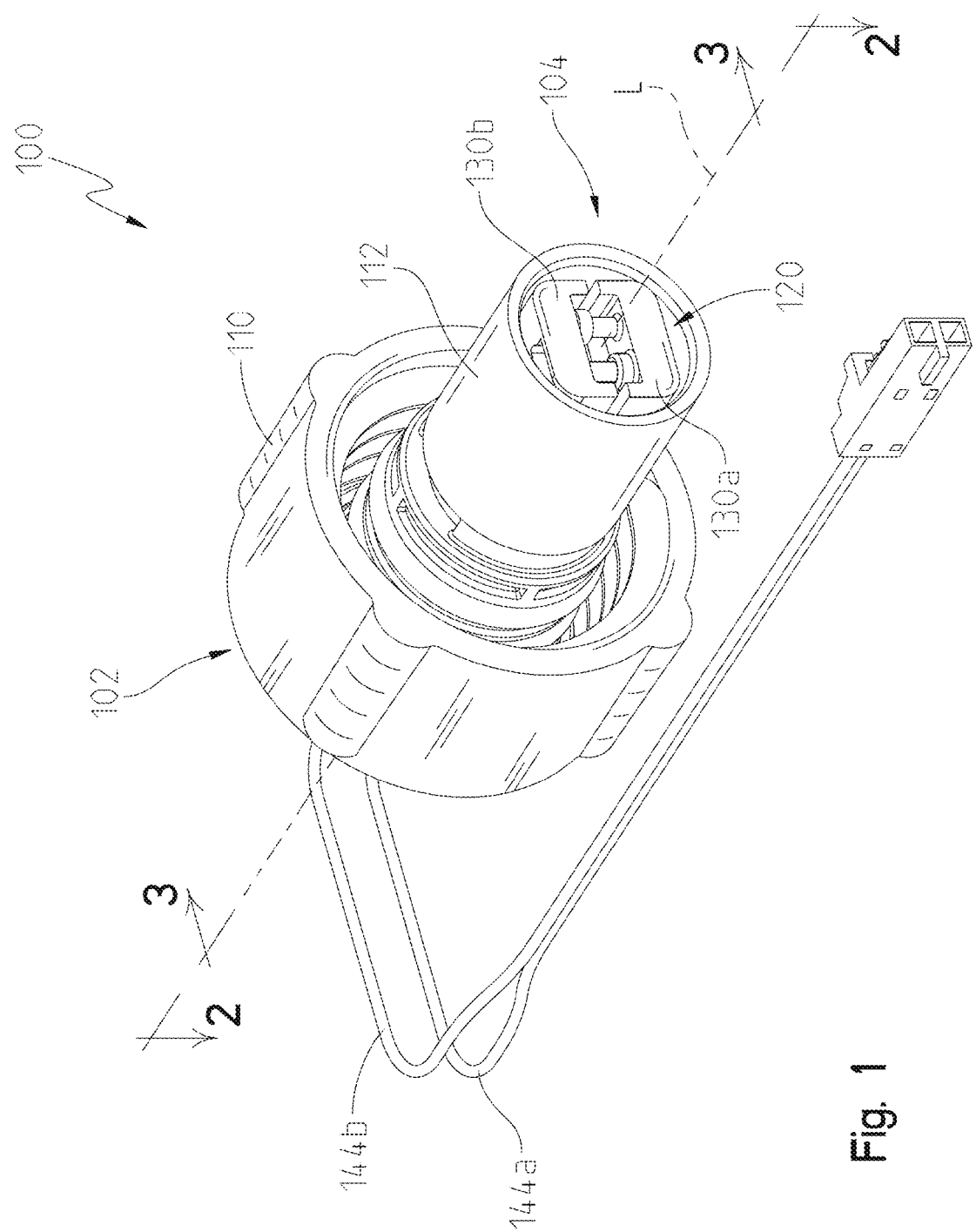
FIG. 1 is an assembled perspective view of an exemplary ozone generator of the present disclosure.
Figure 2:
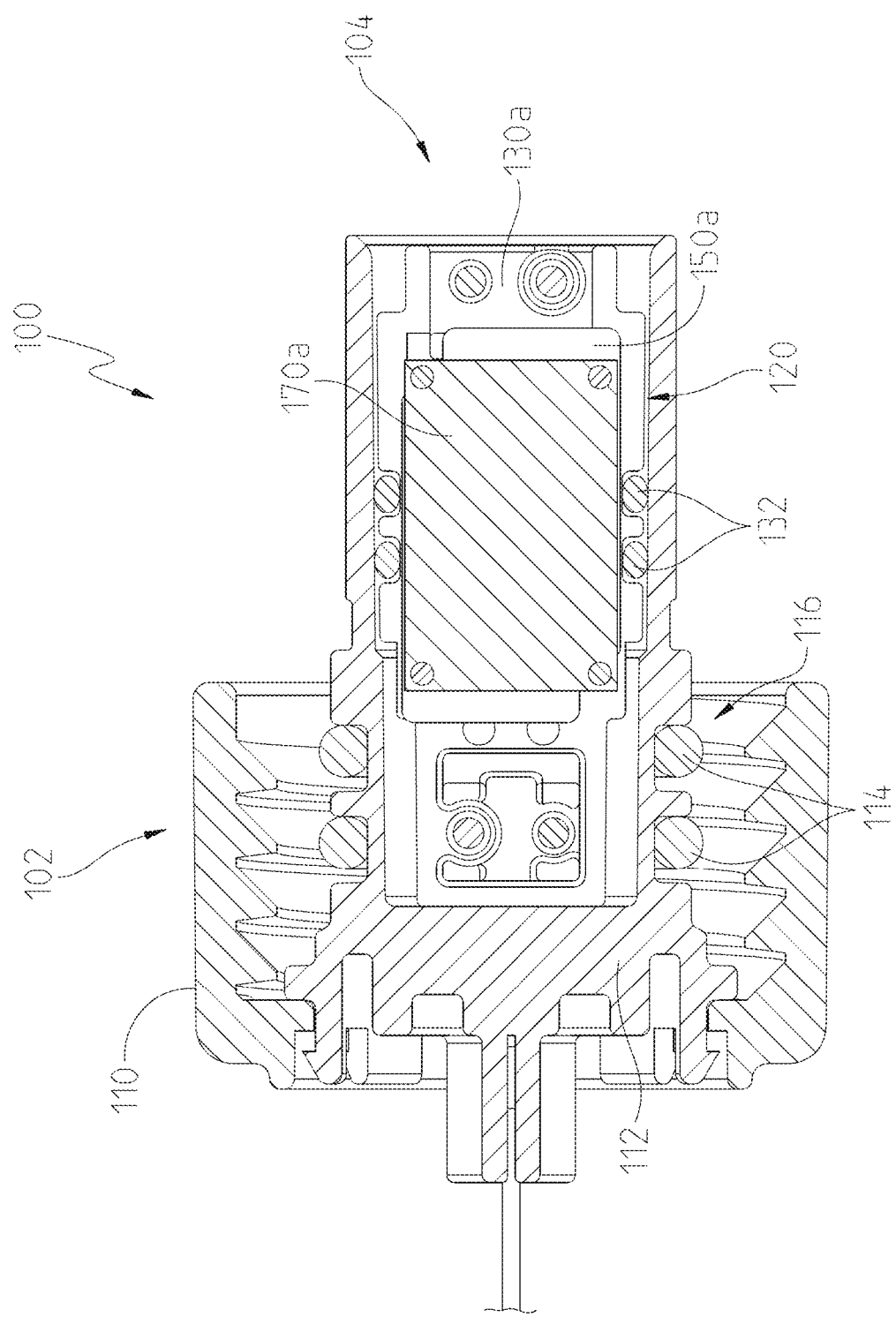
FIG. 2 is a cross-sectional view of the ozone generator of FIG. 1, taken along line 2-2 of FIG. 1.
Figure 3:
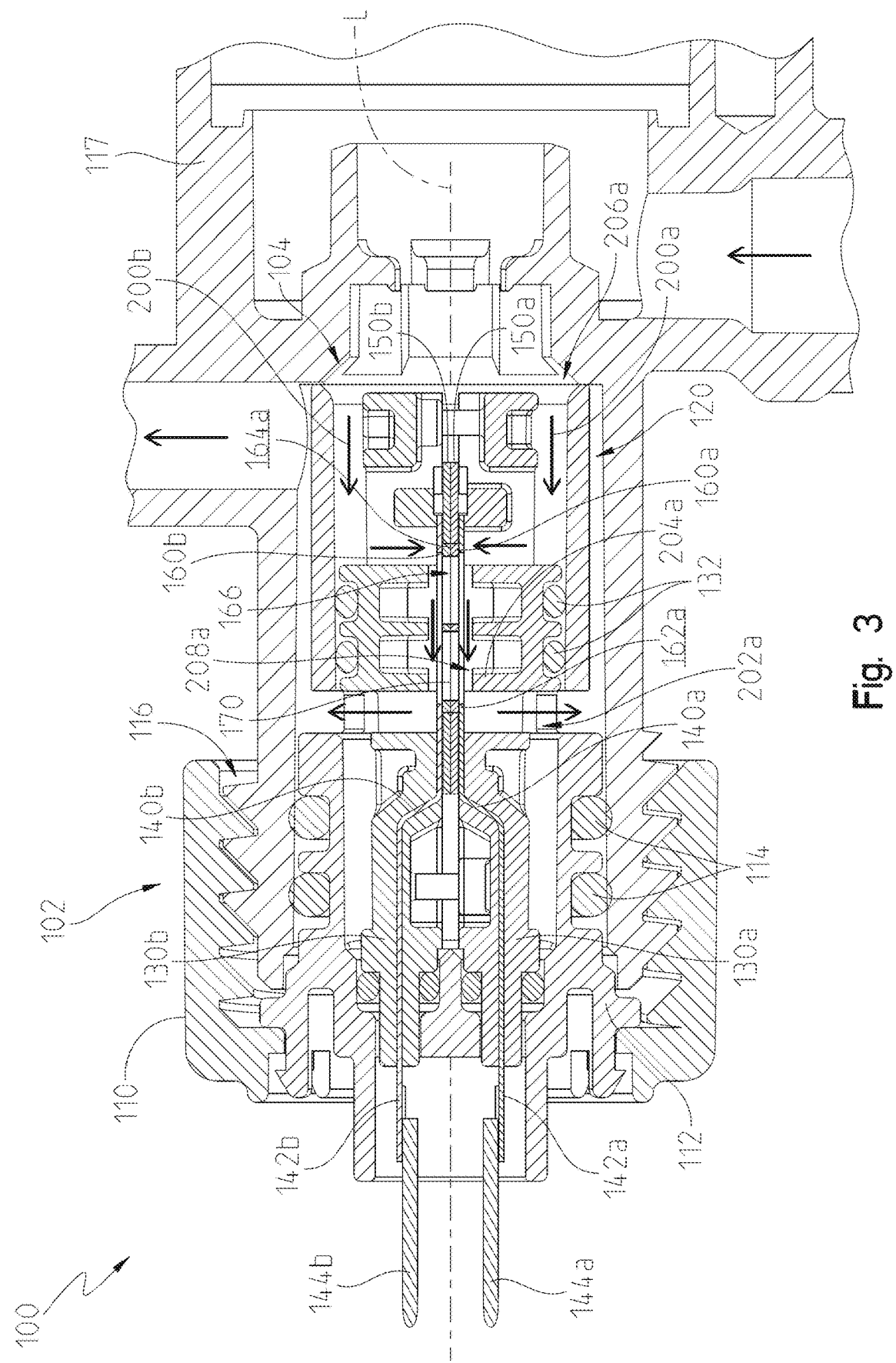
FIG. 3 is another cross-sectional view of the ozone generator of FIG. 1, taken along line 3-3 of FIG. 1, and showing the fluid pipe.

As shown in FIGS. 1-3, the ozone generator 100 includes an outer pipe fitting 110, an outer cylindrical cartridge 112, and one or more outer sealing rings 114 surrounding the cartridge 112. The pipe fitting 110 and the cartridge 112 define a space 116 therebetween for receiving a fluid pipe 117 (FIG. 3). More particularly, the pipe fitting 110 is internally threaded to mate with externally threaded fluid pipe 117. The sealing rings 114, illustratively elastomeric o-rings, promote a sealed connection between the pipe fitting 110, the cartridge 112, and the fluid pipe 117.

Figure 4:
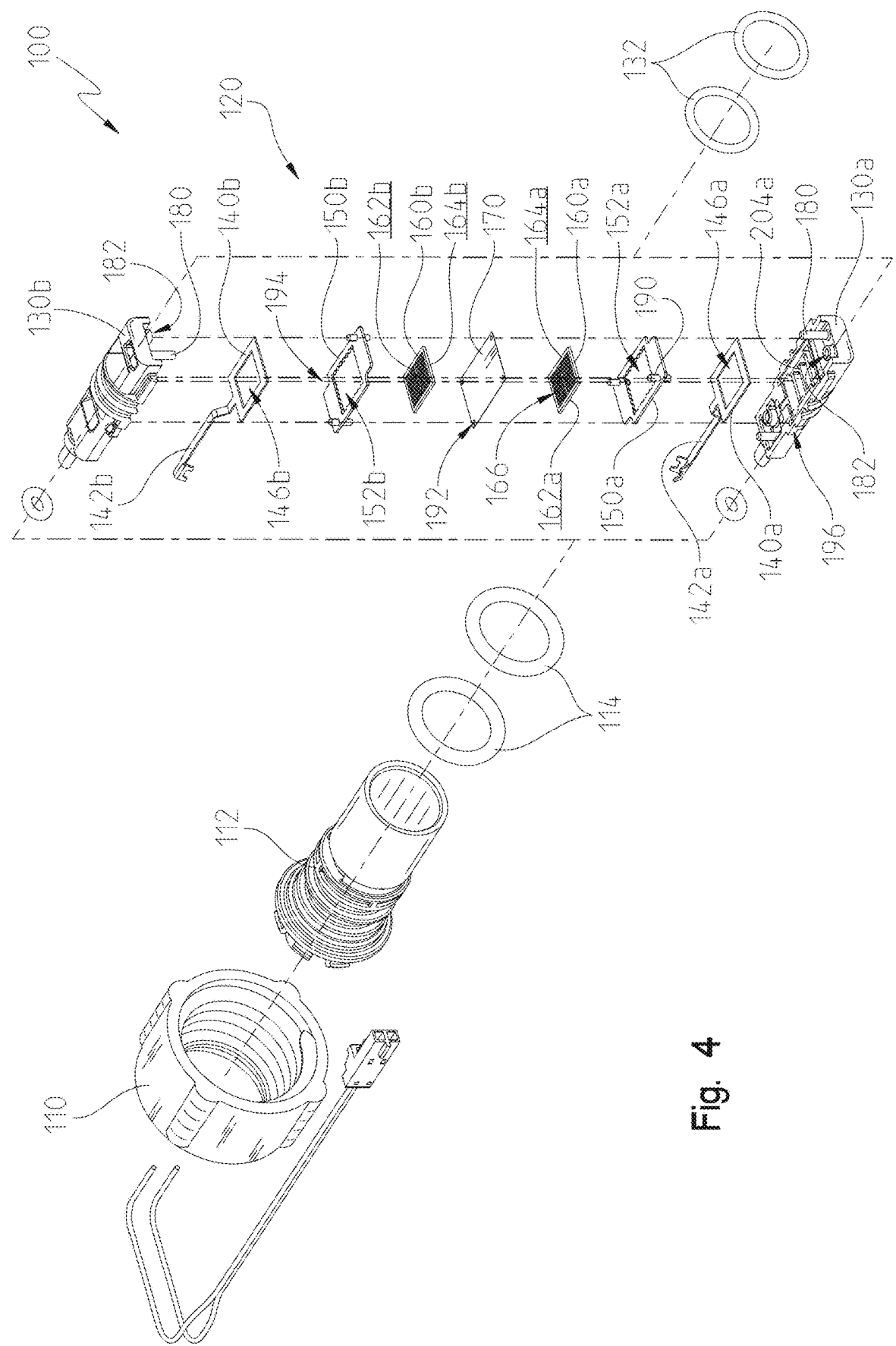
FIG. 4 is an exploded perspective view of the ozone generator of FIG. 1, the ozone generator including first and second housings, first and second current spreaders, first and second frames, first and second electrodes, and a separator.

As shown in FIG. 4, the ozone generator 100 further includes an electrolytic cell assembly 120 located inside the cartridge 112. The illustrative electrolytic cell assembly 120 includes a first housing or carrier 130a and a second housing or carrier 130b, a first current spreader 140a and a second current spreader 140b, a first frame 150a and a second frame 150a, a first electrode 160a and a second electrode 160b, and an electrolytic separator 170. Each component of the electrolytic cell assembly 120 is described further below with continued reference to FIG. 4.

The first and second housings 130a, 130b of the electrolytic cell assembly 120 are compressed together with the other components of the electrolytic cell assembly 120 being mechanically and electrically sandwiched therebetween. In FIG. 4, one or more sealing rings 132, illustratively elastomeric o-rings, are positioned around the housings 130a, 130b to hold the housings 130a, 130b together. Each housing 130a, 130b may be generally rectangular in cross-section except for the areas of rings 132, which may be generally semi-circular in cross-section. According to an exemplary embodiment of the present disclosure, the housings 130a, 130b are held together by the sealing rings 132 independently of the outer cartridge 112 to facilitate storage and assembly of the electrolytic cell assembly 112, with or without cartridge 112 in place. It is also within the scope of the present disclosure that the first and second housings 130a, 130b may be clamped, fastened, or otherwise held together. The housings 130a, 130b are constructed of an electrically insulating material, such as a polymer. An exemplary polymer is the Udel® P-1700 polysulfone material available from Solvay Plastics.

The first and second current spreaders 140a, 140b of the electrolytic cell assembly 120 mate with the first and second housings 130a, 130b, respectively. According to an exemplary embodiment of the present disclosure, the first and second housings 130a, 130b are overmolded onto the first and second current spreaders 140a, 140b, respectively, to form integral, pre-assembled, water-tight, hermetically-sealed components without the need for additional seals (e.g., epoxy). The current spreaders 140a, 140b are constructed of an electrically conductive material, such as titanium or another suitable material. The first current spreader 140a includes a first terminal 142a that extends out of the first housing 130a in a sealed manner for electrical communication with a first wire lead 144a. The first terminal 142a is illustratively planar and supports tabs 143a which are configured to be crimped onto the first wire lead 144a. Likewise, the second current spreader 140b includes a second terminal 142b that extends out of the second housing 130b in a sealed manner for electrical communication with a second wire lead 144b. The second terminal 142b is illustratively planar and supports tabs 143b which are configured to be crimped onto the second wire lead 144b.

The first current spreader 140a also includes a first rectangular body 145a defining a first opening 146a that is sized and shaped to receive and expose the first electrode 160a, as discussed further below. Likewise, the second current spreader 140b includes a second rectangular body 145b defining a second opening 146b that is sized and shaped to receive and expose the second electrode 160b, as discussed further below. The bodies 145a and 145b are illustratively planar wherein the openings 146a, 146b in the current spreaders 140a, 140b may be flush with the surrounding housings 130a, 130b. Between the first terminal 142a and the first opening 146a, the first current spreader 140a may be surrounded by the overmolded material of the first housing 130a in a sealed manner, as shown in FIG. 3. Likewise, between the second terminal 142b and the second opening 146b, the second current spreader 140b may be surrounded by the overmolded material of the second housing 130b in a sealed manner.

The first and second frames 150a, 150b of the electrolytic cell assembly 120 mate with the first and second housings 130a, 130b, respectively. The frames 150a, 150b are constructed of an electrically insulating material, such as a polymer. An exemplary polymer is the Udel® P-1700 polysulfone material available from Solvay Plastics. The first frame 150a includes a first scalloped opening 152a that is sized and shaped to receive the first electrode 160a in electrical communication with the first current spreader 140a. Likewise, the second frame 150b includes a second scalloped opening 152b that is sized and shaped to receive the second electrode 160b in electrical communication with the second current spreader 140b. The first and second frames 150a, 150b may cooperate with the first and second overmolded housings 130a, 130b to otherwise shield or insulate the first and second current spreaders 140a, 140b, respectively, to prevent electrical contact between the first and second current spreaders 140a, 140b.

The first and second electrodes 160a, 160b of the electrolytic cell assembly 120 are received within the first and second frames 150a, 150b, respectively. Each electrode 160a, 160b may have a back side 162a, 162b that interacts with the adjacent current spreader 140a, 140b, respectively, and a front side 164a, 164b that interacts with the separator 170. An exemplary electrode 160a, 160b is constructed of boron-doped silicon or another suitable material. The boron doped silicon material serves as a conductor to pass current between the current spreader and boron doped, The depoed silicon material may be about 200-800 microns thick, such as about 500 microns thick. The front side 164a, 164b of each electrode 160a, 160b may have a boron-doped diamond coating or another suitable coating. The coating may be about 2-10 microns thick. The coating may be applied to the underlying silicon material by chemical vapor deposition (CVD) or another suitable deposition technique. The illustrative electrodes 160a, 160b are generally rectangular in shape, having a width of about 8 millimeters and a length of about 10 millimeters, although the size and shape of the electrodes 160a, 160b may vary.

As discussed further below, the electrodes 160a, 160b communicate with the water flowing through the electrolytic cell assembly 120. Each electrode 160a, 160b may include a plurality of water passageways 166 (e.g., slots) to increase the exposed surface area of each electrode 160a, 160b for communication with water and to allow water flow through each electrode 160a, 160b. To allow for precise control of their size and shape, the water passageways 166 may be formed using deep reactive ion etching (DRIE) or another suitable technique.

Figure 5B:
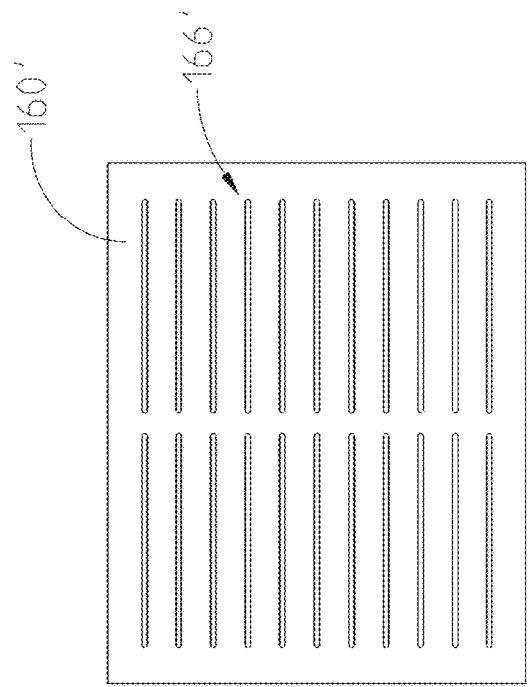
FIGS. 5A-5D are plan views of exemplary electrodes for use in the ozone generator of FIG. 1.
Figure 5D:
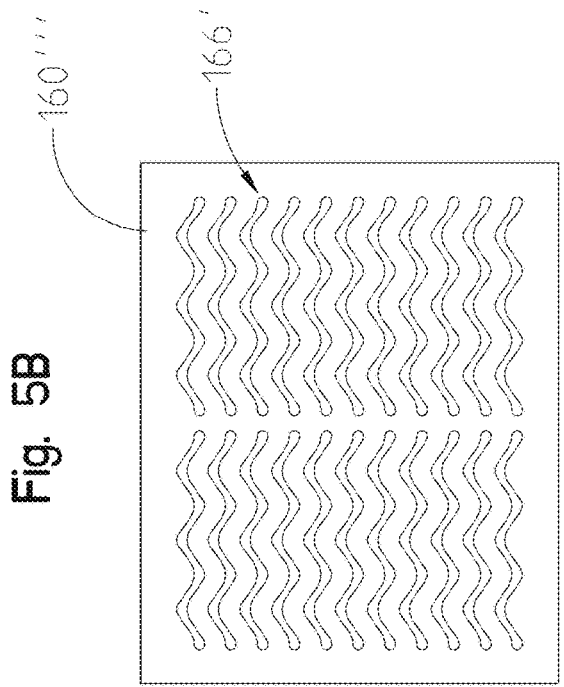
Figure 5A:
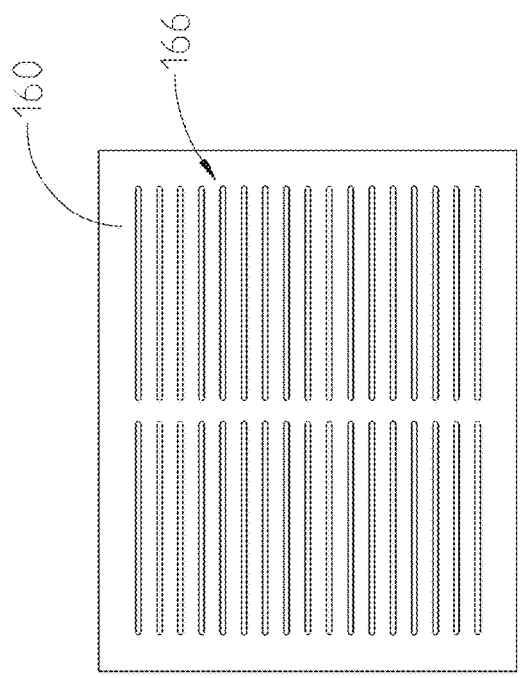
Figure 5C:
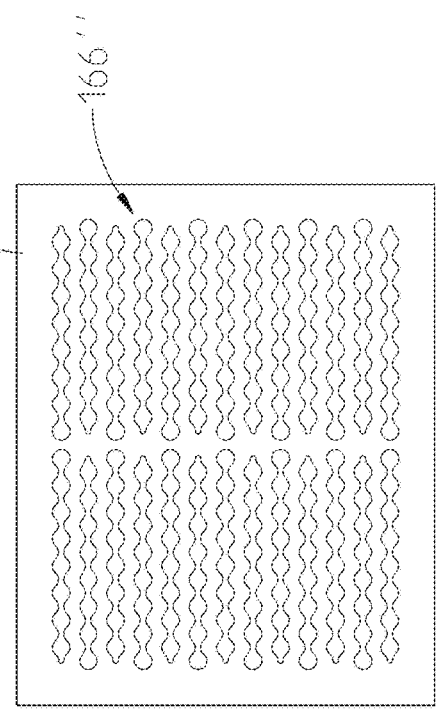
Figure 6:
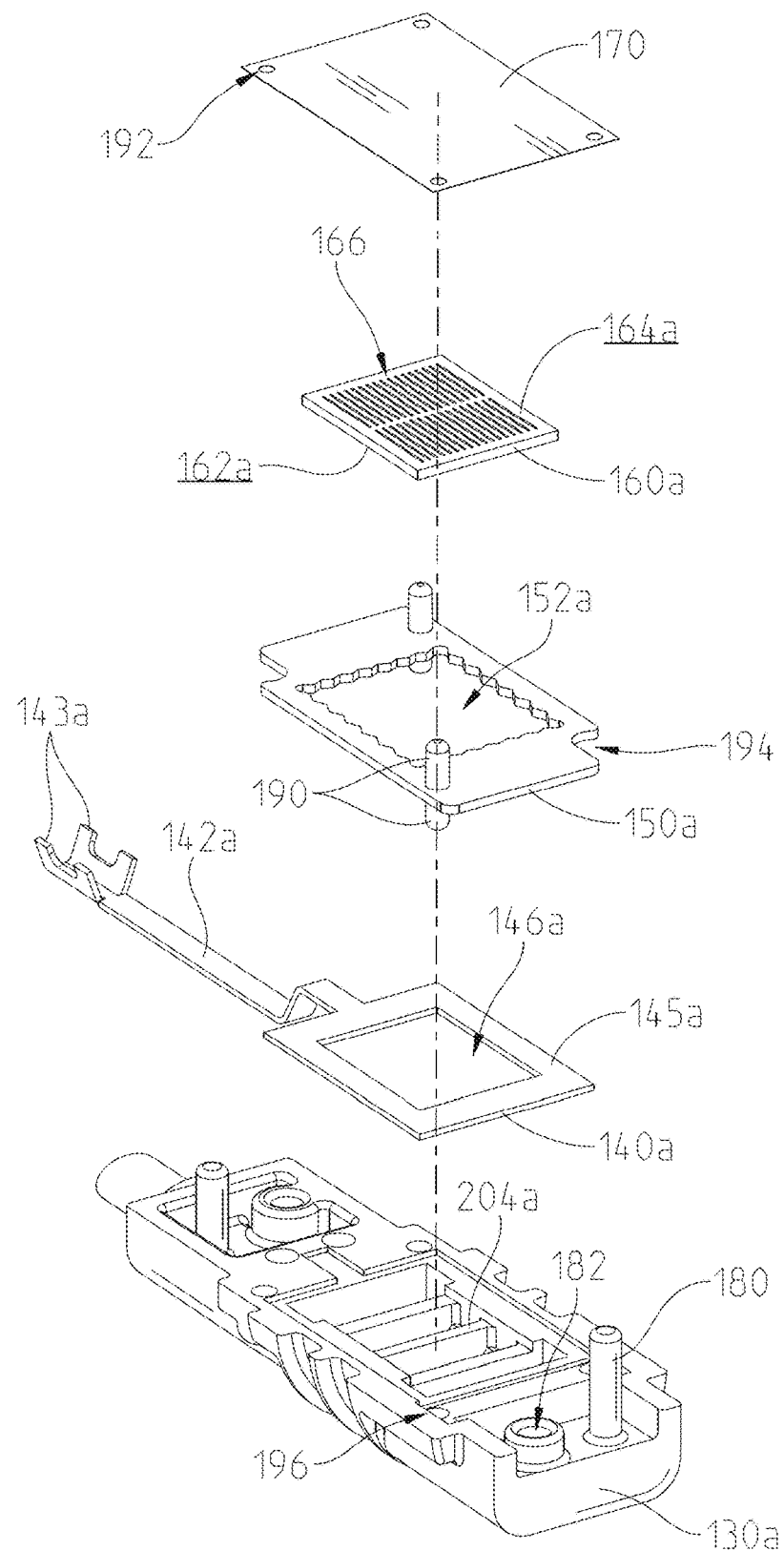
FIG. 6 is an exploded perspective view of the first housing, the first current spreader, the first frame, the first electrode, and the separator of FIG. 4.

Various electrodes 160-160''' having different configurations of water passageways 166-166''' are shown in FIGS. 5A-5D. In FIG. 5A, the electrode 160 includes a relatively large number of (specifically 34) straight water passageways 166. Electrode 160 may be referenced as having a "fine" design. In FIG. 5B, the electrode 160' includes a relatively small number of (specifically 22) straight water passageways 166'. Electrode 160' may be referenced as having a "sparse" design. In FIG. 5C, the electrode 160'' includes an intermediate number of (specifically 26) water passageways 166'' that vary in width repeatedly across their length from a widened bulbous shape to a narrowed straight shape. Electrode 160'' may be referenced as having a "knotted" design. In FIG. 5D, the electrode 160''' includes a relatively small number of (specifically 22) water passageways 166''' that deviate side-to-side in a zig-zag or wave-like pattern across their length. Electrode 160''' may be referenced as a "serpentine" design.

Additional details of illustrative electrodes 160 are provided in U.S. Provisional Patent Application Ser. No. 62/191,741, filed Jul. 13, 2015, entitled "Electrode for an Ozone Generator", the entire disclosure of which is expressly incorporated herein by reference.

The separator 170 of the electrolytic cell assembly 120 is positioned between the first and second electrodes 160a, 160b. The separator 170 is a proton exchange membrane (PEM) designed to conduct protons between the electrodes 160a, 160b. The separator 170 may be constructed of a solid polymer electrolyte (SPE) membrane. An exemplary SPE membrane is a polytetrafluoroethylene (PTFE)/perfluorosulfonic acid (PFSA) copolymer membrane, which is commercially available from DuPont™ as a Nafion® membrane. Because pressures on the separator 170 are balanced, the separator 170 may be a thin, cast film. The thin separator 170 may allow for some cross-diffusion of water, hydrogen, and/or oxygen without negatively impacting the performance of the electrolytic cell assembly 120. In fact, such diffusion may promote efficiency and output by reducing polarization voltage associated with dehydration and reducing bulk ion resistance. An exemplary separator 170 may be about 20-30 microns thick, such as about 25 microns thick.

Referring next to FIGS. 6-9, the components of the electrolytic cell assembly 120 may include registration features to facilitate the assembly process and, once assembled, to produce stable mechanical connections between the components. For example, the first housing 130a may include one or more posts 180 that register with corresponding holes 182 in the second housing 130b. As another example, the first frame 150a may include one or more posts 190 that register with corresponding holes 192 in the separator 170, corresponding notches 194 in the second frame 150b, and corresponding holes 196 in both housings 130a, 130b The outer perimeter of the electrodes 160a, 160b may be smaller than the area defined by the posts 190 in the frames 150a, 150b to avoid the need for forming corresponding registration holes in the electrodes 160a, 160b, which could risk damage to the fragile electrodes 160a, 160b and reduce the active area of the electrodes 160a, 160b.

Figure 7:
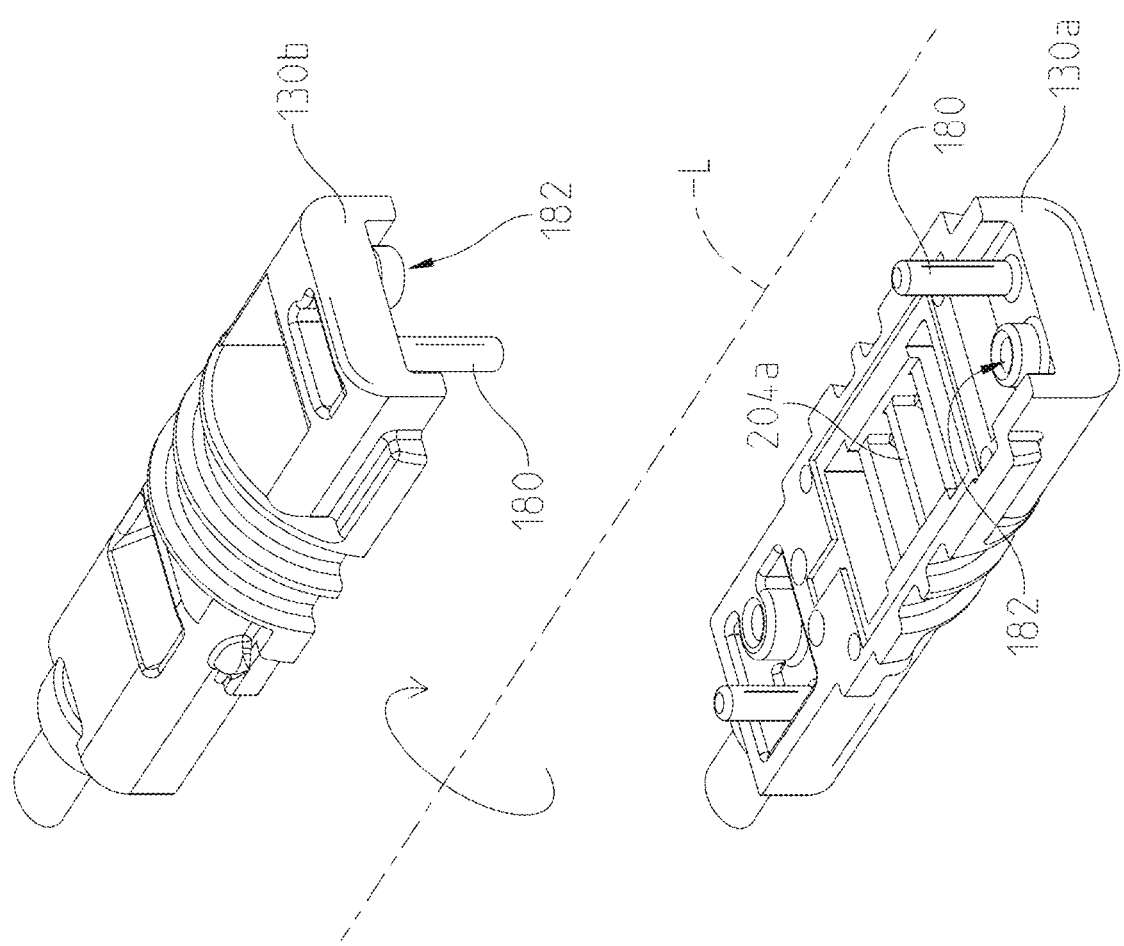
FIG. 7 is a perspective view of the first and second housings of FIG. 4.
Figure 8:
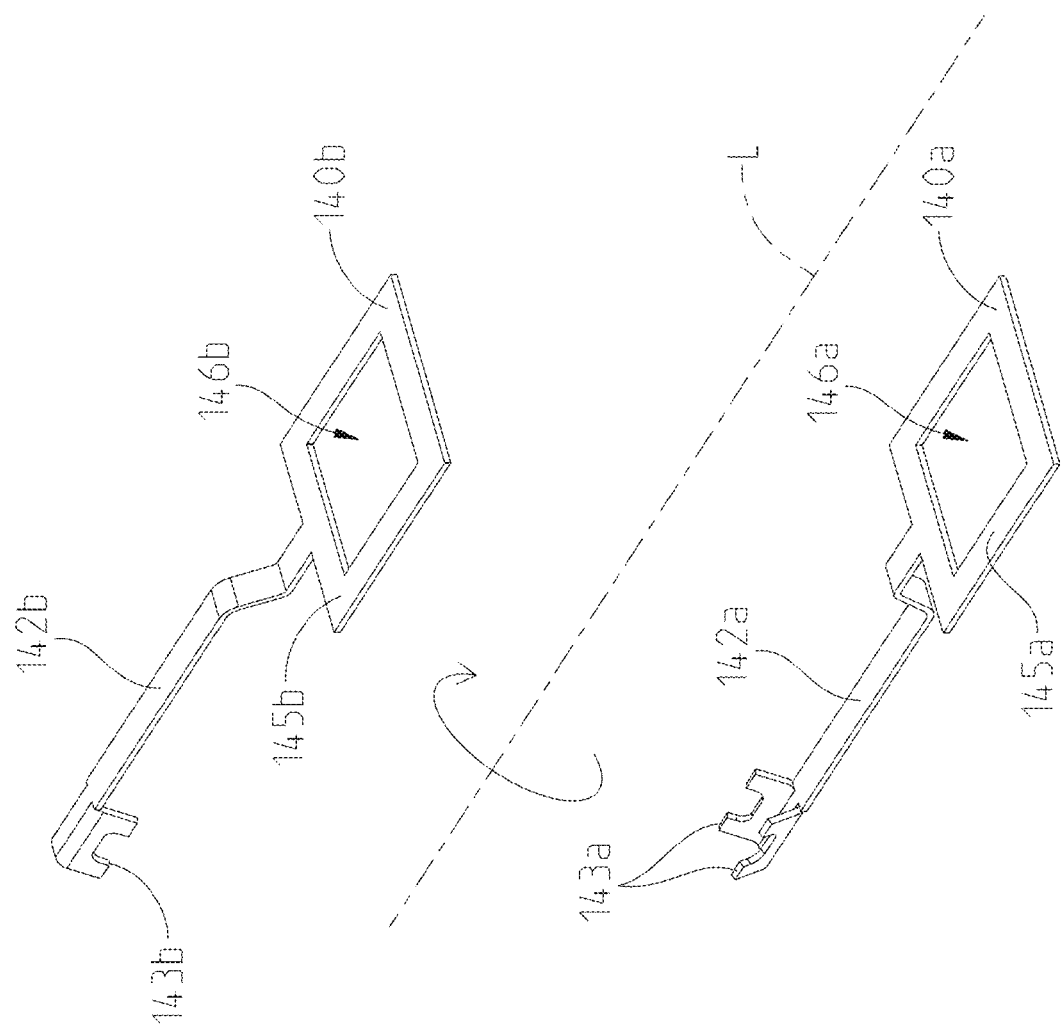
FIG. 8 is a perspective view of the first and second current spreaders of FIG. 4.
Figure 9:
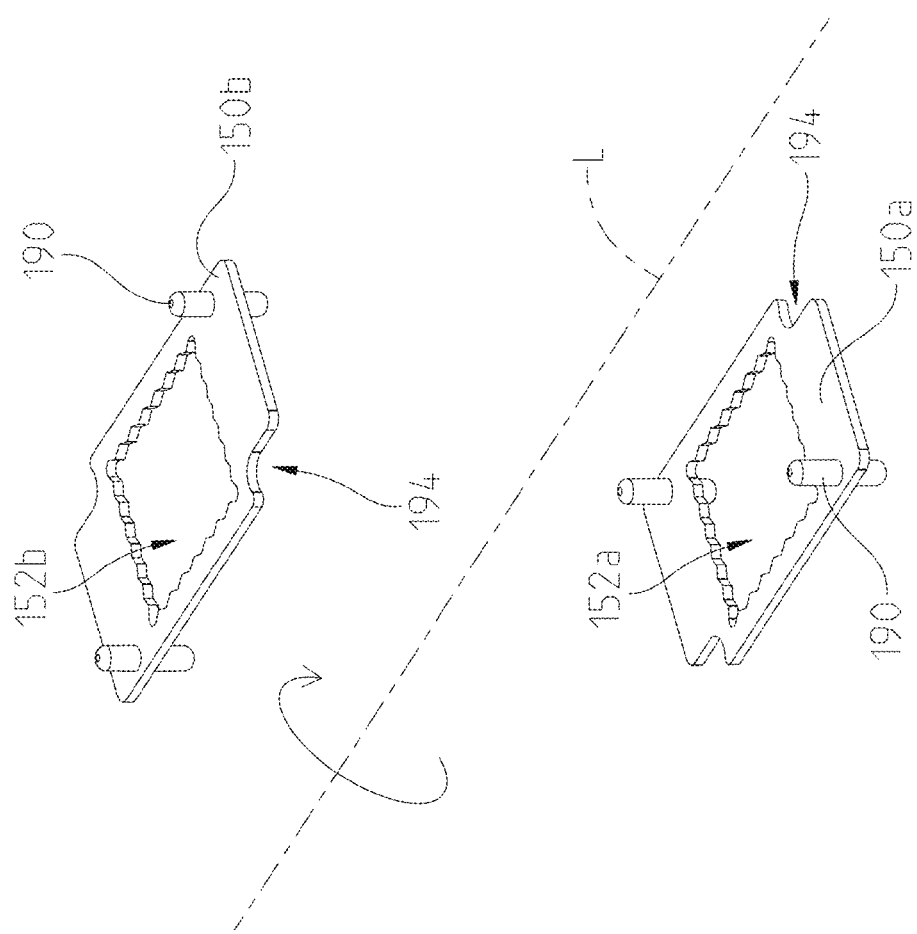
FIG. 9 is a perspective view of the first and second frames of FIG. 4.

Corresponding components of the electrolytic cell assembly 120 may be identical in construction and rotated into the desired orientation. As shown in FIG. 7, the same housing component may be placed in a first orientation for use as the first housing 130a or rotated 180 degrees about the longitudinal axis L for use as the second housing 130b. The housing component may have opposite registration features located on opposite sides of the longitudinal axis L such that, when rotated, the registration posts 180 on the first housing 130a correspond with the registration holes 182 in the second housing 130b, and vice versa. As shown in FIG. 8, the same current spreader component may be placed in a first orientation for use as the first current spreader 140a or rotated 180 degrees about the longitudinal axis L for use as the second current spreader 140b. As shown in FIG. 9, the same frame component may be placed in a first orientation for use as the first frame 150a or rotated 180 degrees about the longitudinal axis L for use as the second frame 150b. The frame component may have opposite registration features located on opposite sides of the longitudinal axis L such that, when rotated, the registration posts 190 on the first frame 150a correspond with notches 194 in the second frame 150b, and vice versa. Advantageously, these identical constructions may reduce manufacturing, inventory, and replacement costs and may facilitate the assembly process.

Returning to FIG. 3, the ozone generator 100 defines a first water flow path 200a in fluid communication with the first electrode 160a and a second water flow path 200b in fluid communication with the second electrode 160b. The first water flow path 200a is illustratively formed between the outer cartridge 112 and the first housing 130a, and the second water flow path 200b is illustratively formed between the outer cartridge 112 and the second housing 130b. Advantageously, forming the flow paths 200a, 200b between the cartridge 112 and the housings 130a, 130b may ease mold design, tooling, and molding. Also, forming the flow paths 200a, 200b between the cartridge 112 and the housings 130a, 130b may take advantage of the sealing rings 132 around the housings 130a, 130b to force the water flow through the desired flow paths 200a, 200b, not freely around the housings 130a, 130b.

The first water flow path 200a is described further herein, but the same description may apply to the second water flow path 200b. In FIG. 3, the first water flow path 200a begins at a first inlet 202a located in the cylindrical sidewall of the cartridge 112. From the first inlet 202a, the first water flow path 200a travels around a first ribbed barrier 204a that projects inwardly from the first housing 130a. Specifically, the first water flow path 200a travels: (1) toward the back side 162a of the first electrode 160a in a direction perpendicular to the first electrode 160a and the longitudinal axis L, (2) around a 90 degree bend, (3) across the back side 162a of the first electrode 160a in a direction parallel to the first electrode 160a and the longitudinal axis L, (4) around another 90 degree bend, and (5) away from the back side 162a of the first electrode 160a in a direction perpendicular to the first electrode 160a and the longitudinal axis L. Finally, the first water flow path 200a travels to a first outlet 206a located in the longitudinal end of the cartridge 112. Upon exiting the cartridge 112, the first water flow path 200a may re-combine with the second water flow path 200b.

The water flow paths 200a, 200b may be designed to create high water velocity with low turbulence across the electrodes 160a, 160b. Creating a high water velocity may help flush away bubbles from the electrodes 160a, 160b when the bubbles are still small in size, before they have time to rest and expand, thereby making room for more water to contact the electrodes 160a, 160b, avoiding bubble attachment on the electrodes 160a, 160b, and avoiding entrapment of gas products in large bubbles. Creating a high water velocity may also promote hydration of the separator 170. In certain embodiments, the height of the gap or clearance 208a between the first barrier 204a in the first housing 130a and the back side 162a of the first electrode 160a may be controlled to optimize the water flow therebetween.

In operation, electric current is applied to the electrodes 160a, 160b causing electrolysis to occur in the electrolytic cell assembly 120. Specifically, a positive electric potential is applied to one electrode (e.g., the first electrode 160a) to form an anode, and a negative electric potential is applied to the other electrode (e.g., the second electrode 160b) to form a cathode. As a result, a voltage differential may be produced across the first electrode 160a and the second electrode 160b. The electric potential may be applied using a power source (not shown), which may be coupled to the first and second terminals 142a, 142b via first and second leads 144a, 144b, respectively. The water flowing through the electrolytic cell assembly 120 may serve as the electrolytic solution without the need for an additional electrolytic solution.

At the positive anode (e.g., the first electrode 160a), the water is electrolyzed and broken down into oxygen ions and hydrogen ions. At least some of the oxygen ions are converted to ozone ($O_3$) due to the higher over-potential voltage of the conductive diamond coating on the anode. The ozone may dissolve into the water to perform a disinfecting function in the water. The remaining oxygen ions may be converted to more stable oxygen ($O_2$), which may have little value in this application. Electrons from the electrolyzed water are transported to the cathode (e.g., the second electrode 160b) via the leads 144a, 144b, while hydrogen ions (i.e., protons) from the electrolyzed water are transported to the cathode across the separator 170. At the cathode, the hydrogen ions and the electrons from the electrolyzed water recombine to form hydrogen ($H_2$) bubbles. The water streams passing over the electrodes 160a, 160b sweep away the $O_3$ and $O_2$ from the anode and the $H_2$ from the cathode. The same water streams also supply fresh water to replenish the water consumed during electrolysis.

In certain embodiments, the polarity of the electrolytic cell assembly 120 may be selectively reversed to reduce scale build-up. In a first state, the first electrode 160a may serve as the anode, and the second electrode 160b may serve as the cathode, for example. In a second state, the first electrode 160a may be switched from the anode to the cathode, and the second electrode 160b may be switched from the cathode to the anode. The reversed state may also force water through the separator 170 to pre-hydrate the anode upon return to the first state. The duration of the reversed state may be relatively short, such as about 20 seconds or less.

Figure 10:
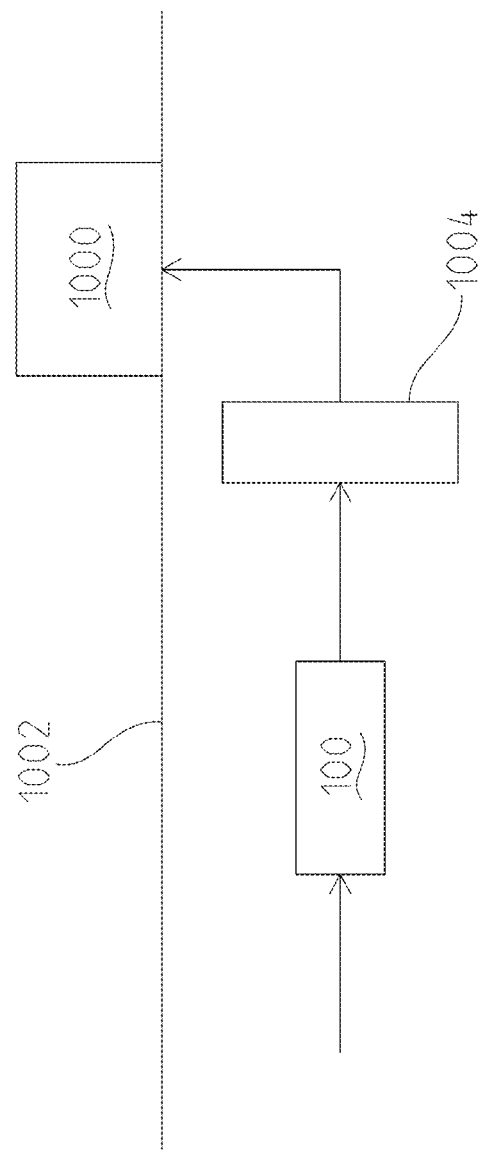
FIG. 10 is a schematic view of the ozone generator of FIG. 1 in fluid communication with a faucet.
Figure 11:
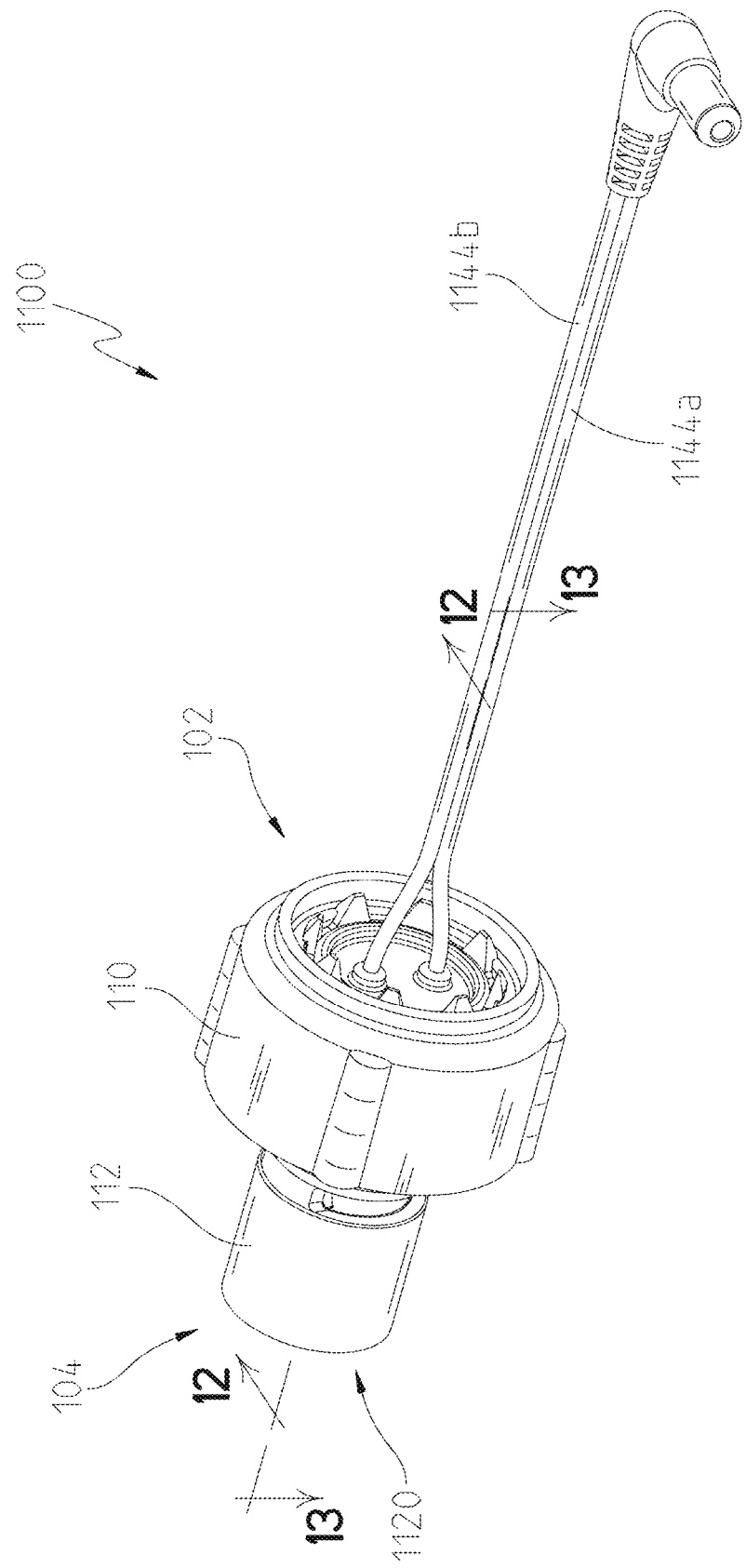
FIG. 11 is an assembled perspective view of a further exemplary ozone generator of the present disclosure.
Figure 12:
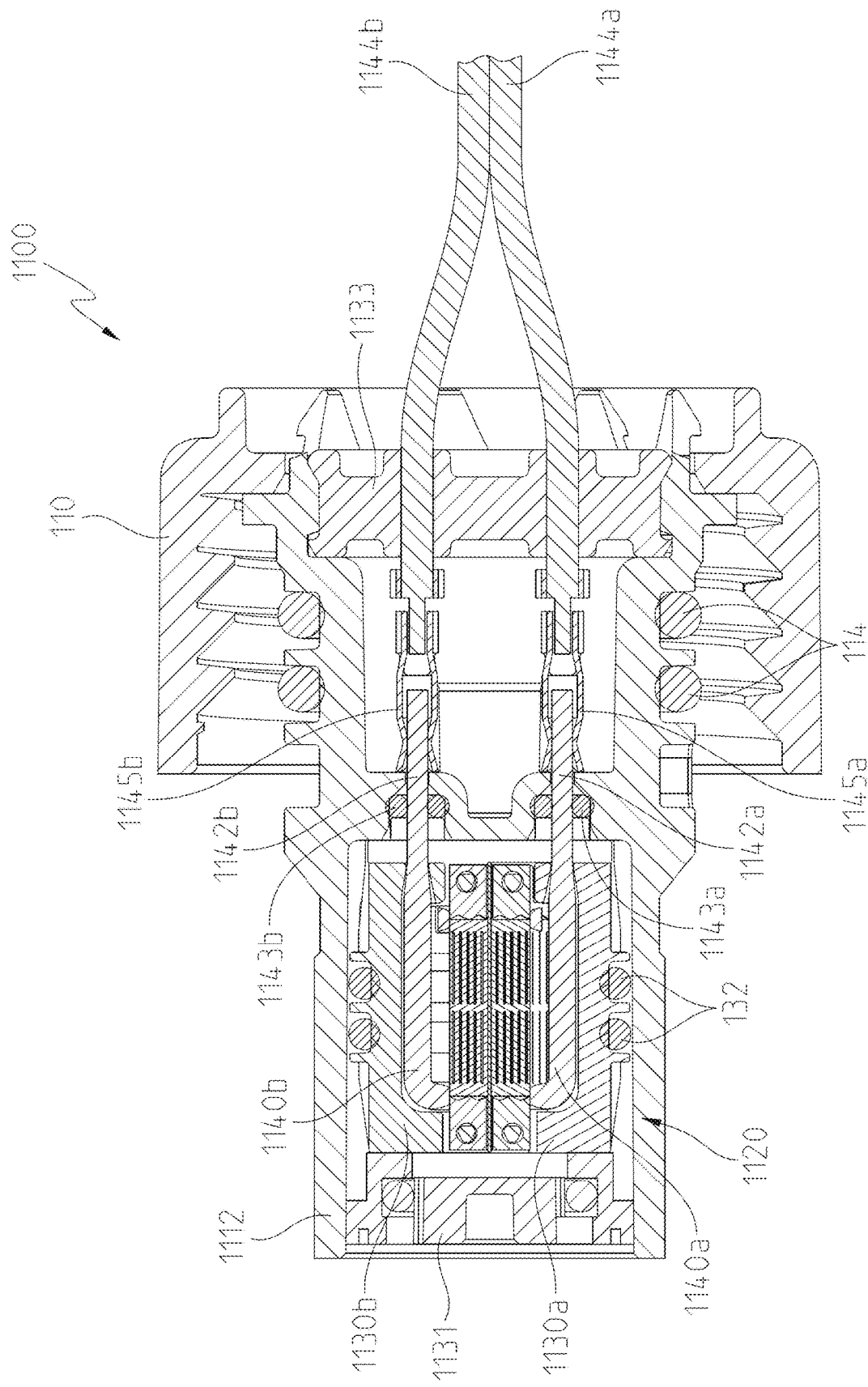
FIG. 12 is a cross-sectional view of the ozone generator of FIG. 11, taken along line 12-12 of FIG. 11.
Figure 13:
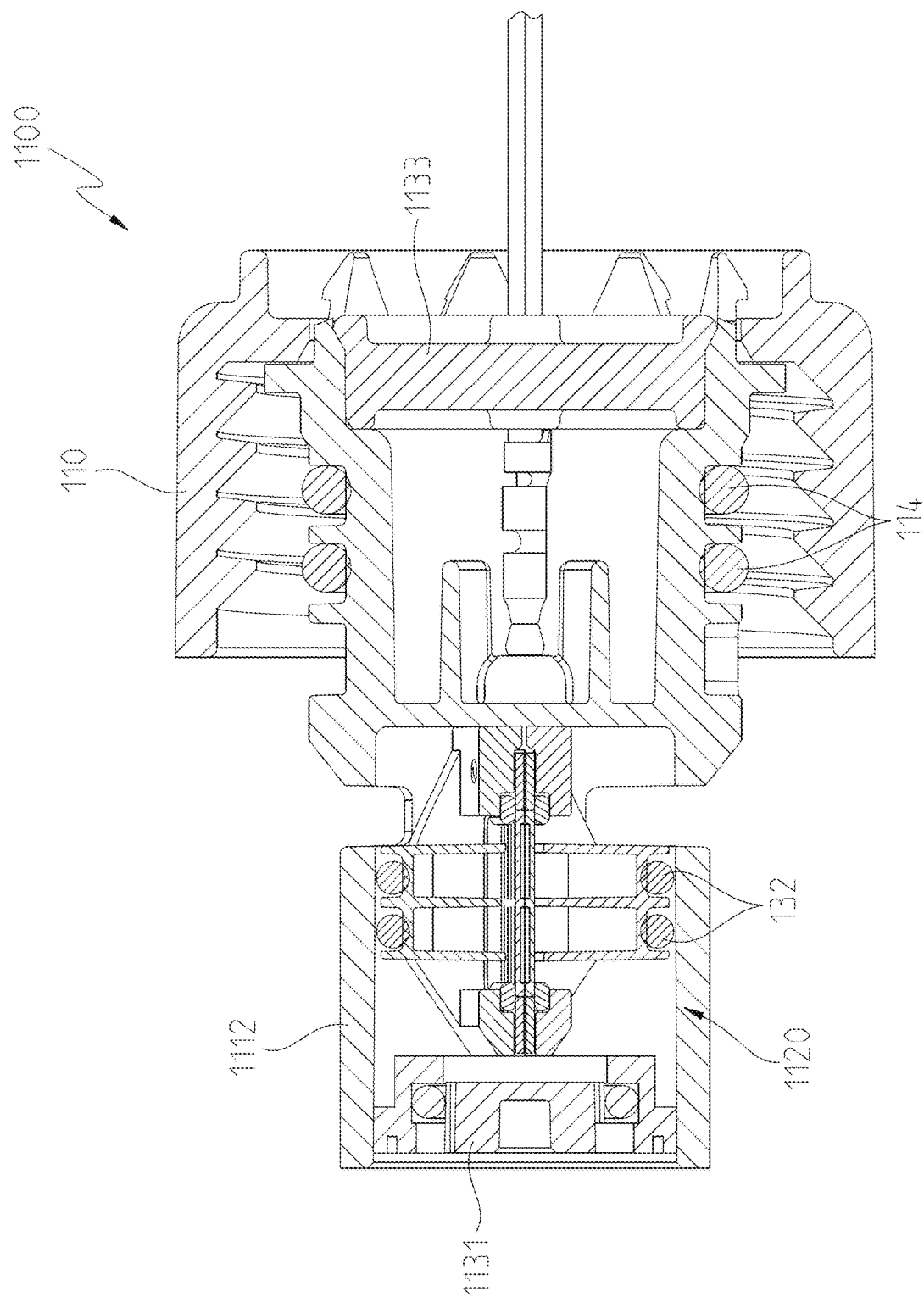
FIG. 13 is another cross-sectional view of the ozone generator of FIG. 11, taken along line 13-13 of FIG. 11.
Figure 14:
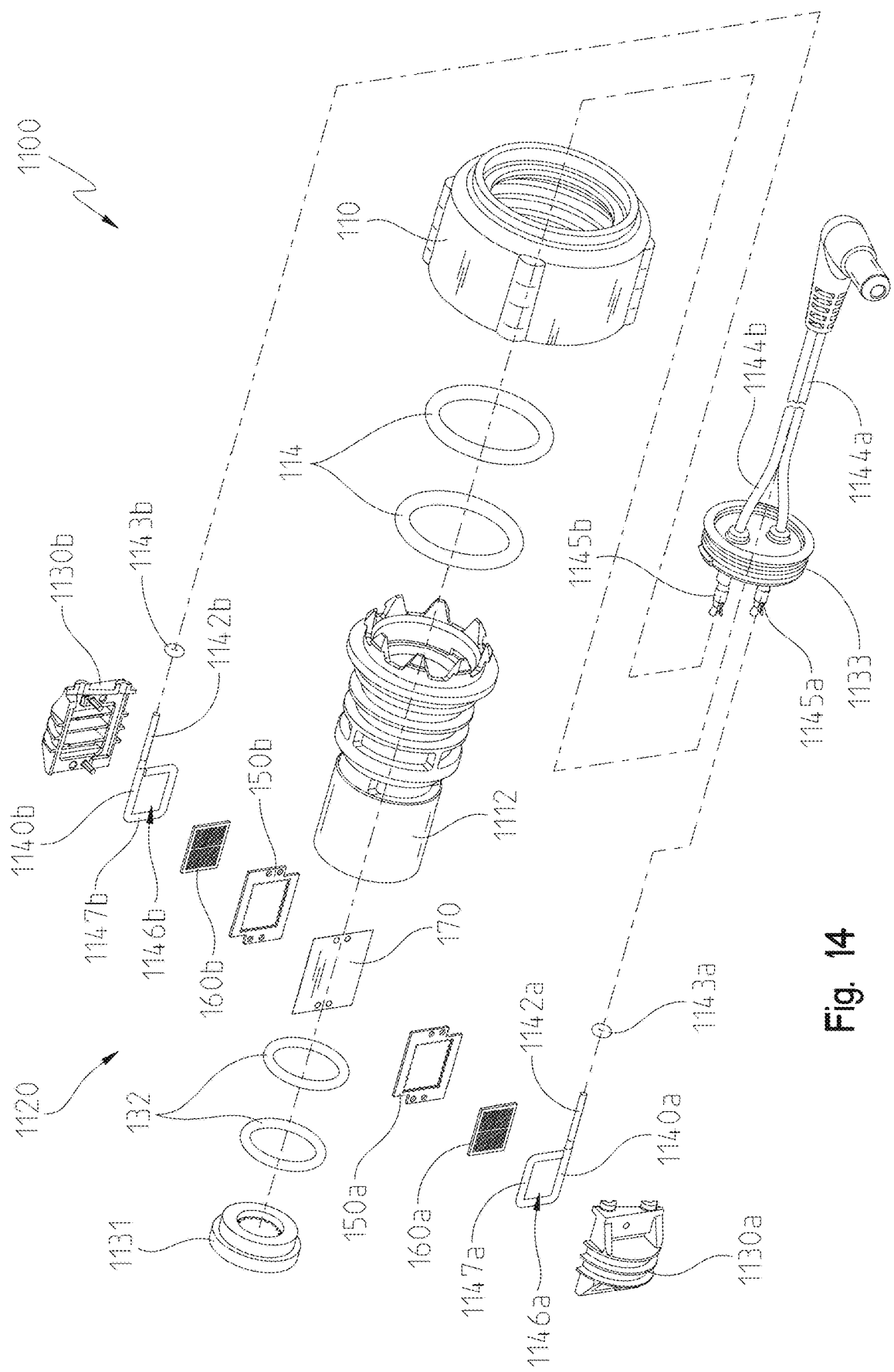
FIG. 14 is an exploded perspective view of the ozone generator of FIG. 11, the ozone generator including first and second housings, first and second current spreaders, first and second frames, first and second electrodes, and a separator.
Figure 15:
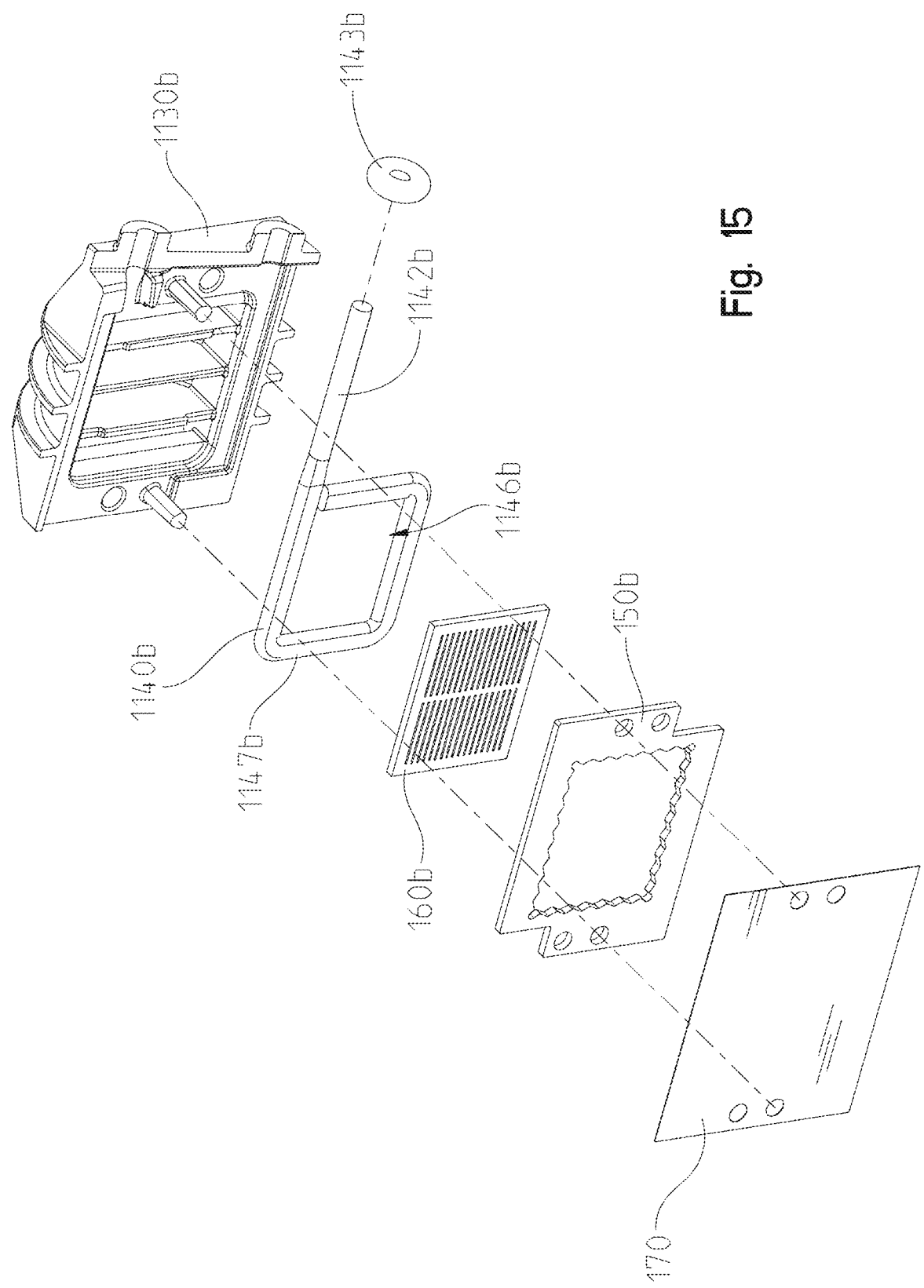
FIG. 15 is an exploded perspective view of the first housing, the first current spreader, the first frame, the first electrode, and the separator of FIG. 14.

Referring next to FIG. 10, the ozone generator 100 may be installed in fluid communication with a faucet 1000. For example, the ozone generator 100 may be installed beneath a sink deck 1002 in fluid communication with the faucet 1000. In certain embodiments, the ozone generated by the ozone generator 100 may remain in the water upon reaching the faucet 1000 to continue performing the disinfecting function. In this embodiment, the ozone-containing water from the faucet 1000 may be used as a disinfectant or a cleaning agent, for example. In other embodiments, the ozone generated by the ozone generator 100 may perform an initial disinfecting function in the water but, before reaching the faucet 1000, the ozone may be destroyed or otherwise removed from the water. For example, as shown in FIG. 10, a filter 1004 (e.g., a carbon black filter) may be provided downstream of the ozone generator 100 and upstream of the faucet 1000, which gives the ozone from the ozone generator 100 time to initially treat the water before being removed by the filter 1004. In this embodiment, the treated water from the faucet 1000 may be used as drinking water, for example.

Additional information regarding an illustrative use of the ozone generator 100 is disclosed in U.S. Patent Application Publication No. 2014/352799 to Rosko et al., entitled "Ozone Distribution in a Faucet", the entire disclosure of which is expressly incorporated herein by reference.

Referring now to FIGS. 11-14, a further illustrative ozone generator 1100 is shown as including many of the same components as ozone generator 100 detailed above. In the following description, similar components to those of ozone generator 100 are identified with like reference numbers.

The ozone generator 1100 includes an electrolytic cell assembly 1120 located inside a cartridge 1112. The illustrative electrolytic cell assembly 1120 includes a first housing or carrier 1130a and a second housing or carrier 1130b, a first current spreader 1140a and a second current spreader 1140b, a first frame 150a and a second frame 150b, a first electrode 160a and a second electrode 160b, and a separator 170.

The first and second housings 1130a, 1130b of the electrolytic cell assembly 120 are compressed together with the other components of the electrolytic cell assembly 1120 being mechanically and electrically sandwiched therebetween. Sealing rings 132, illustratively elastomeric o-rings, are positioned around the housings 1130a, 1130b to hold the housings 1130a, 1130b together. The housings 1130a, 1130b may be held together by the sealing rings 132 independently of the outer cartridge 1112 to facilitate storage and assembly of the electrolytic cell assembly 1112, with or without cartridge 1112 in place. It is also within the scope of the present disclosure that the first and second housings 1130a, 1130b may be clamped, fastened, or otherwise held together. The housings 1130a, 1130b are constructed of an electrically insulating material, such as a polymer. End caps 1131 and 1133 may be secured to opposing ends of the cartridge 1112. End cap 1131 is illustratively a flow restrictor configured to limit flow rate into the ozone generator 1100. End cap 1133 is illustratively an elastomeric seal through which the wire leads 1144a and 1144b extend.

The first and second current spreaders 1140a, 1140b of the electrolytic cell assembly 120 mate with the first and second housings 1130a, 1130b, respectively. The current spreaders 1140a, 1140b are constructed of an electrically conductive material, such as a wire formed of titanium or another suitable material. The first current spreader 1140a includes a first terminal 1142a that extends out of the first housing 1130a in a sealed manner for electrical communication with a first wire lead 1144a. The first terminal 1142a is illustratively circular in cross-section to define a pin connector for electrical communication with a conventional socket 1145a supported by the end cap 1133. An o-ring 1143a is received on the first terminal 1142a. Likewise, the second current spreader 1140b includes a second terminal 1142b that extends out of the second housing 1130b in a sealed manner for electrical communication with a second wire lead 1144b. The second terminal 1142b is illustratively circular in cross-section to define a pin connector for electrical communication with a conventional socket 1145b supported by the end cap 1133. An o-ring 1143b is received on the second terminal 1142b.

The first current spreader 1140a also includes a first rectangular body 1147a defining a first opening 1146a that is sized and shaped to receive and expose the first electrode 160a. Likewise, the second current spreader 1140b includes a second rectangular body 1147b defining a second opening 1146b that is sized and shaped to receive and expose the second electrode 160b. The bodies 1147a and 1147b are illustratively planar wherein the openings 1146a, 1146b in the current spreaders 1140a, 1140b may be flush with the surrounding housings 1130a, 1130b. The bodies 1147a and 1147b define a closed loop to provide enhanced contact with the electrodes 160a and 160b, respectively.

With reference now to FIGS. 16-27, an illustrative ozone system 1200 for use with faucet 1000 is shown as including ozone generator 1100. In the following description, similar components to those of ozone generator 1100 detailed above are identified with like reference numbers. It should be appreciated that other ozone generators, such as ozone generator 100, may be also used in the ozone system 1200.

Figure 21:
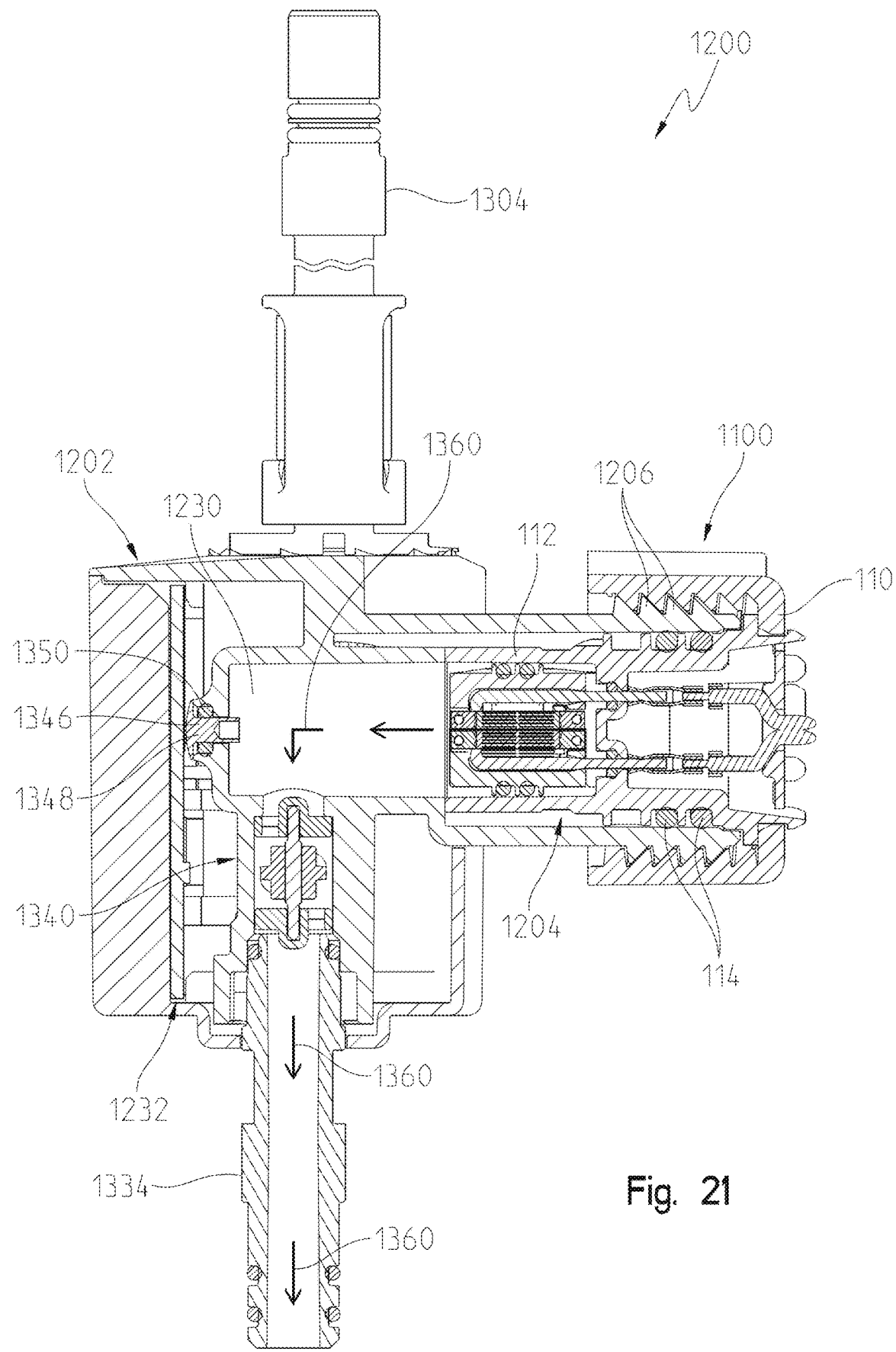
FIG. 21 is a cross-sectional view taken along line 21-21 of FIG. 16.

Referring to FIGS. 16-18 and 21, a solenoid valve body 1202 includes an ozone generator receiving chamber 1204 receiving the ozone generator 1100. External threads 1206 of the solenoid valve body 1202 cooperate with the internally threaded pipe fitting 110 of the ozone generator 1100. Sealing rings 114 promote a sealed connection between the pipe fitting 110, the cartridge 1112, and the solenoid valve body 1202 (FIG. 21).

Figure 18:
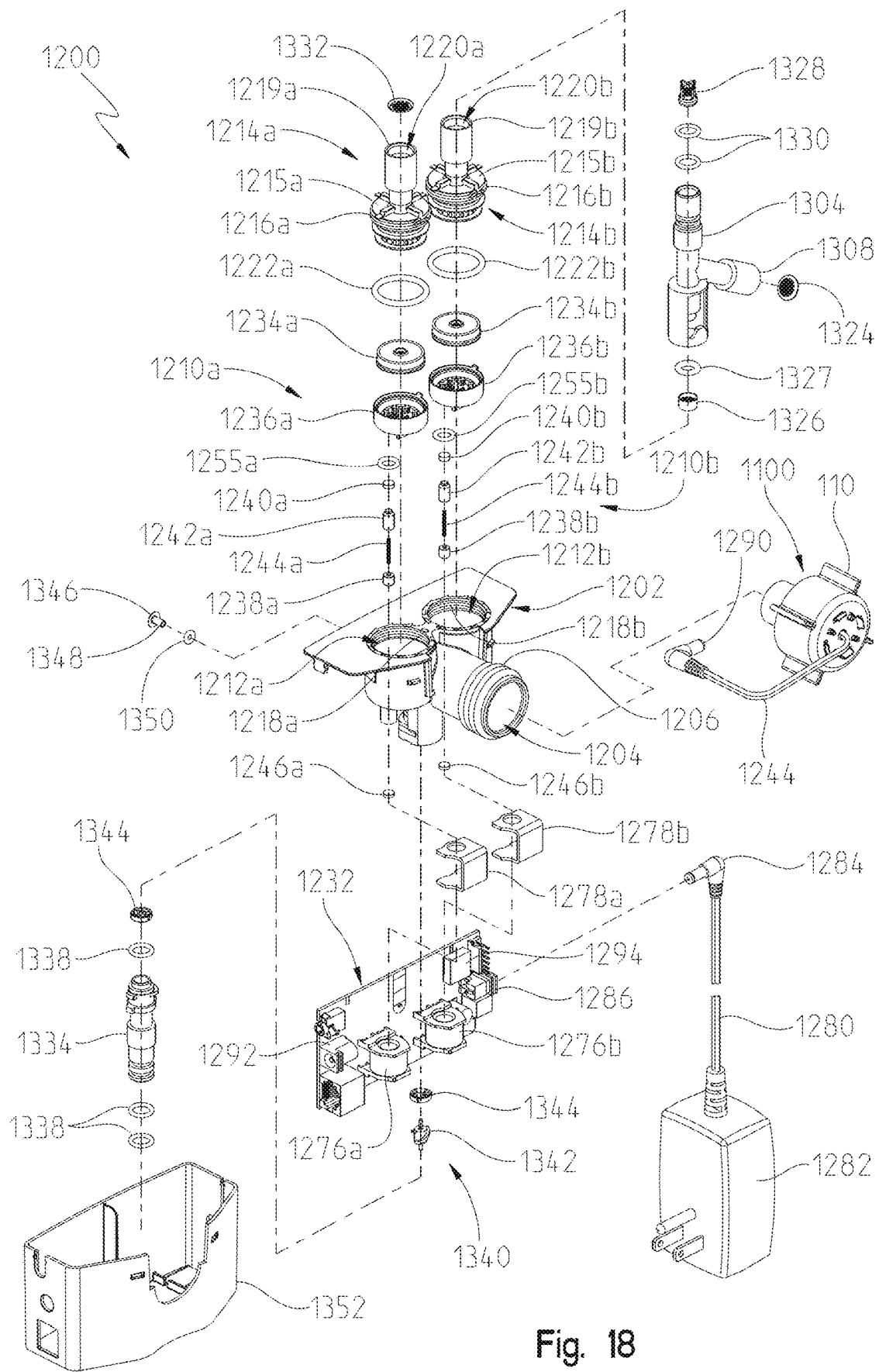
FIG. 18 is an exploded perspective view of the illustrative system of FIG. 17.
Figure 22:
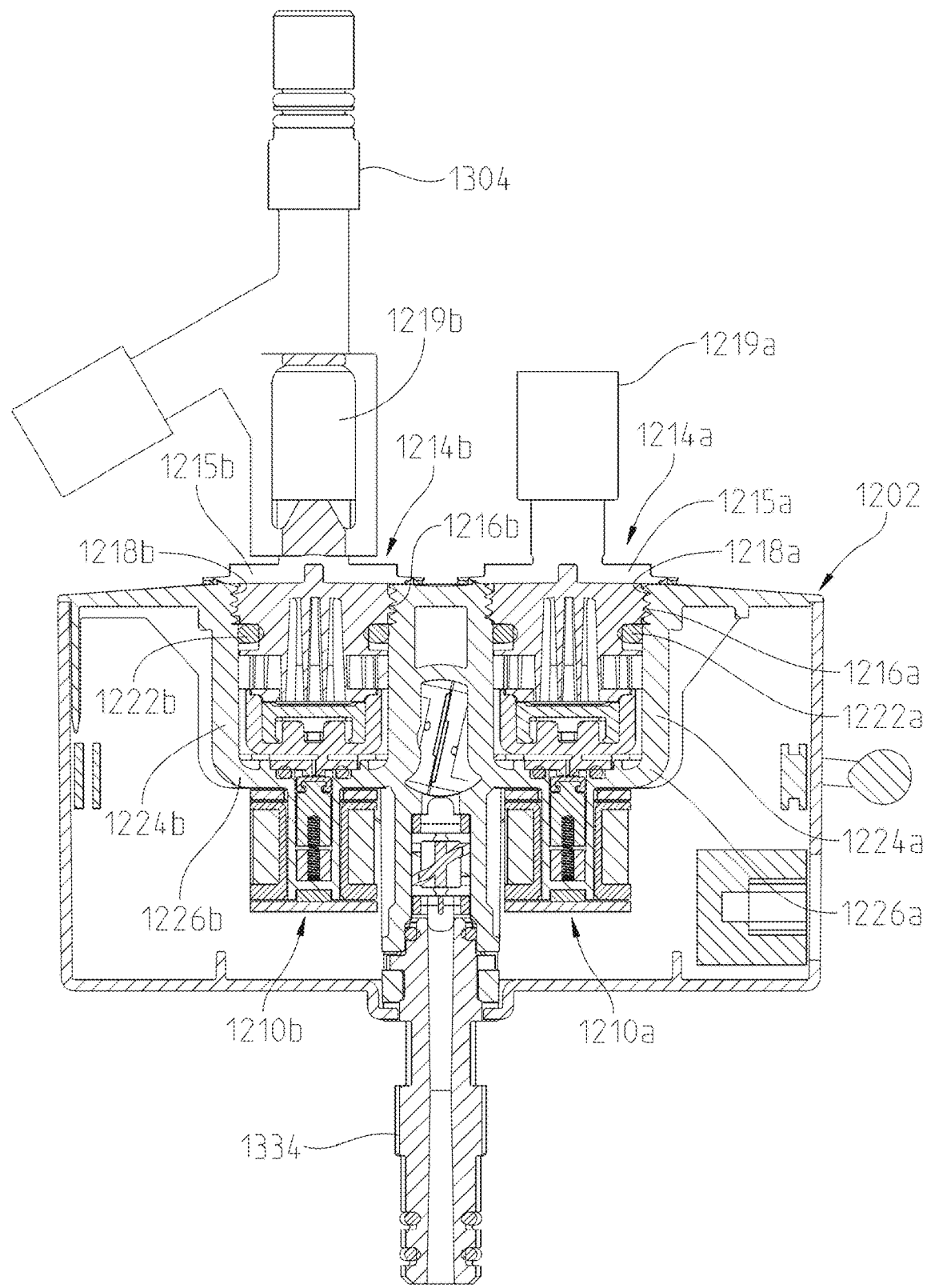
FIG. 22 is a cross-sectional view taken along line 22-22 of FIG. 16.

With reference to FIGS. 18 and 22, first, or mixed water, pilot operated diaphragm solenoid valve 1210a is received within a first valve receiving chamber 1212a of the valve body 1202. A second, or ozone, pilot operated diaphragm solenoid valve 1210b is received within a second valve receiving chamber 1212b of the valve body 1202. As further detailed herein, the valve receiving chamber 1212b is in fluid communication with the ozone generator receiving chamber 1204 through the valve body 1202. Inlet housings or retainers 1214a and 1214b secure the solenoid valves 1210a and 1210b within the valve receiving chambers 1212a and 1212b. More particularly, the inlet retainers 1214a, 1214b each include a retainer body 1215a, 1215b supporting external threads 1216a, 1216b that mate with internal threads 1218a, 1218b of the valve body 1202 to secure the inlet retainers 1214a, 1214b within the valve receiving chambers 1212a, 1212b. The retainer bodies 1215a, 1215b include connector tubes 1219a, 1219b extend outwardly from valve body 1202. Fluid passageways 1220a, 1220b extend through the inlet retainers 1214a, 1214b. Sealing rings 1222a, 1222b promote sealed connections between the retainers 1214a, 1214b and the solenoid valve body 1202.

Figure 23:
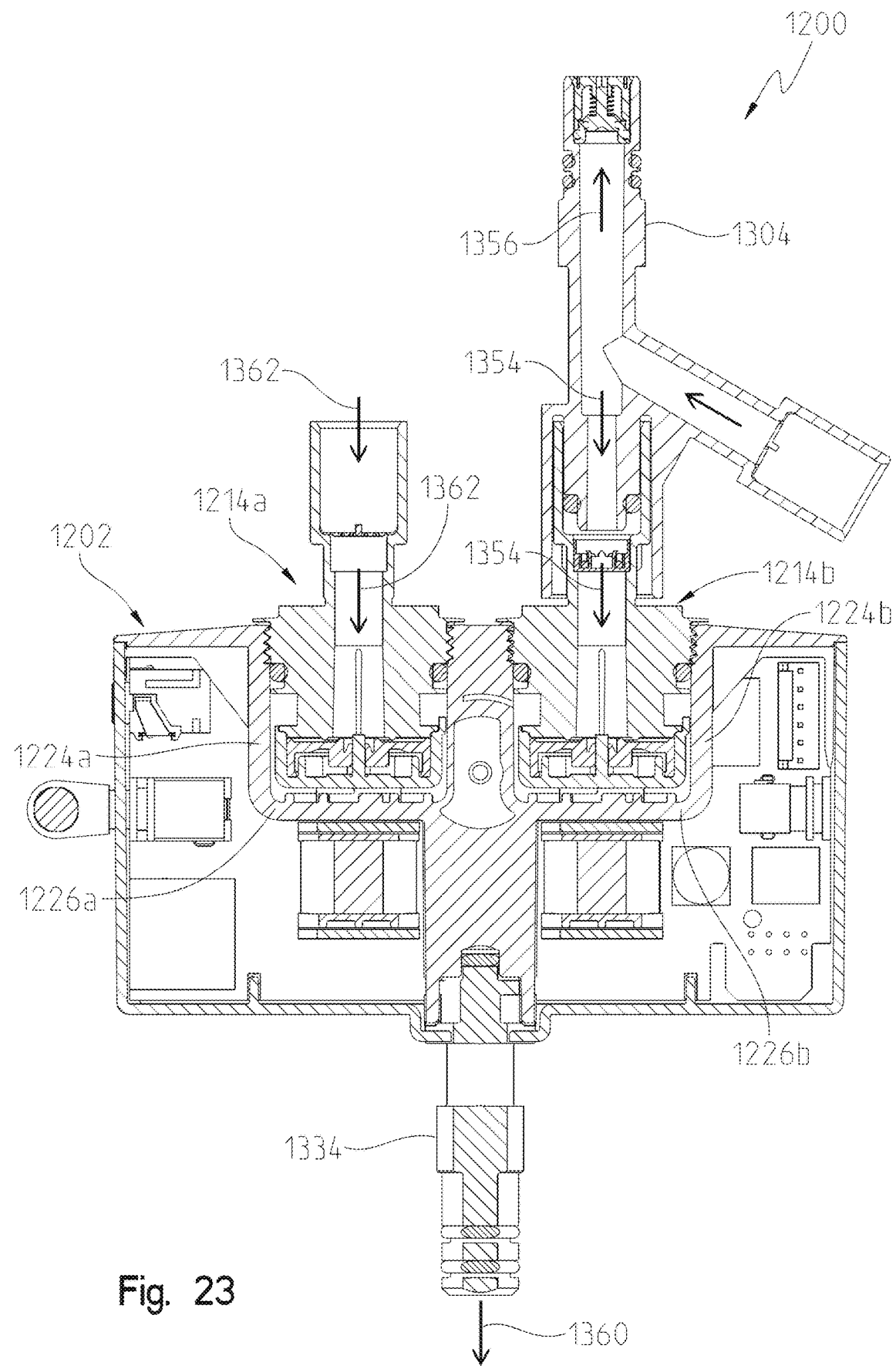
FIG. 23 is a cross-sectional view taken along line 23-23 of FIG. 17.
Figure 24:
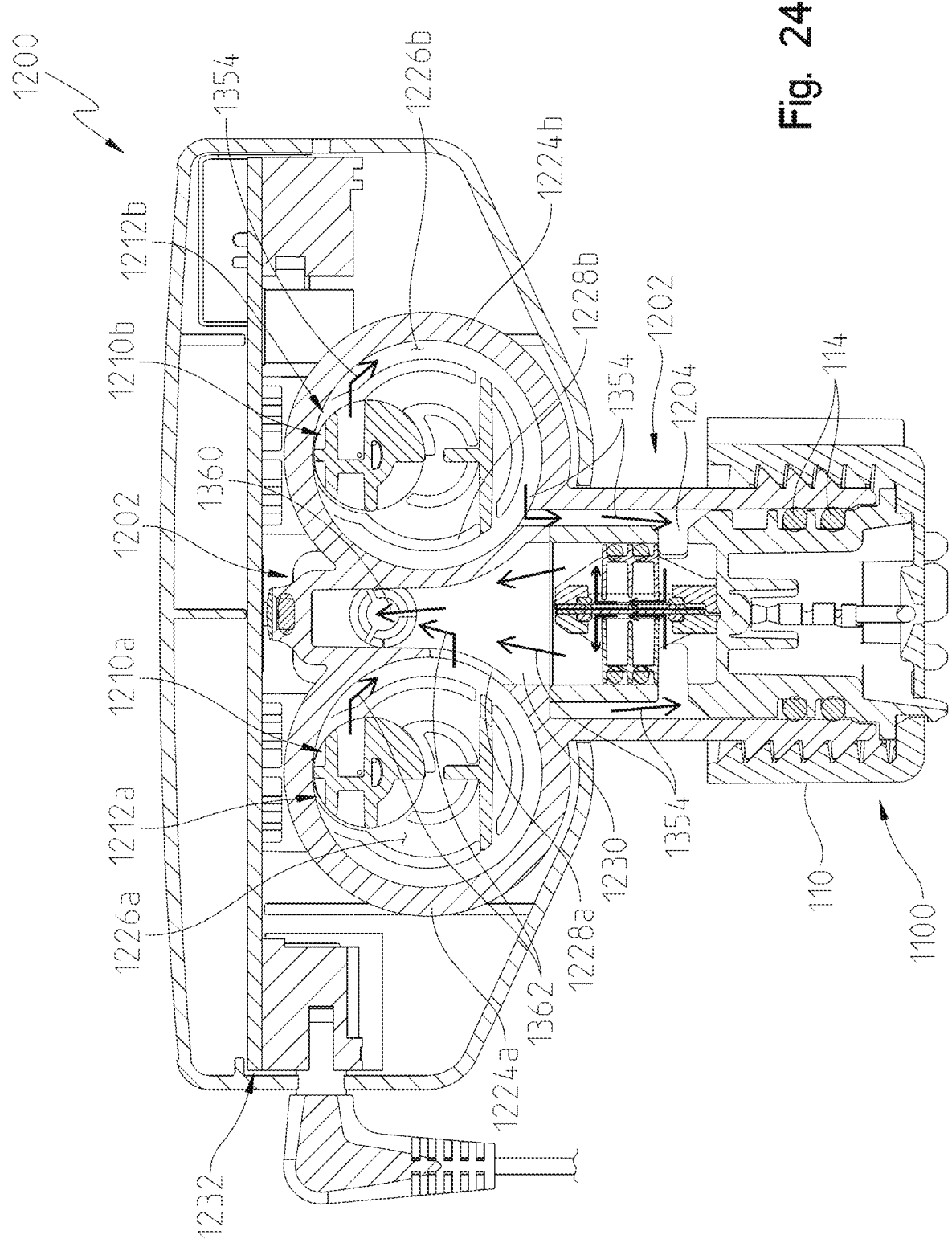
FIG. 24 is a cross-sectional view taken along line 24-24 of FIG. 16.

Referring now to FIGS. 22-24, each valve receiving chamber 1212a, 1212b of the valve body 1202 includes a cylindrical side wall 1224a, 1224b extending upwardly from a base 1226a, 1226b. A first radial opening or slot 1228a in the side wall 1224a provides fluid communication between the valve receiving chamber 1212a (and the first solenoid valve 1210a) and an outlet passageway 1230 (FIG. 24). A second radial opening or slot 1228b in the side wall 1224b provides fluid communication between the valve receiving chamber 1212b (and the first solenoid valve 1210a) and the ozone generator receiving chamber 1204 (and the ozone generator 1100). After passing through the ozone generator 100 in the manner further detailed above, water flows to the outlet passageway 1230 (FIG. 24).

Figure 19:
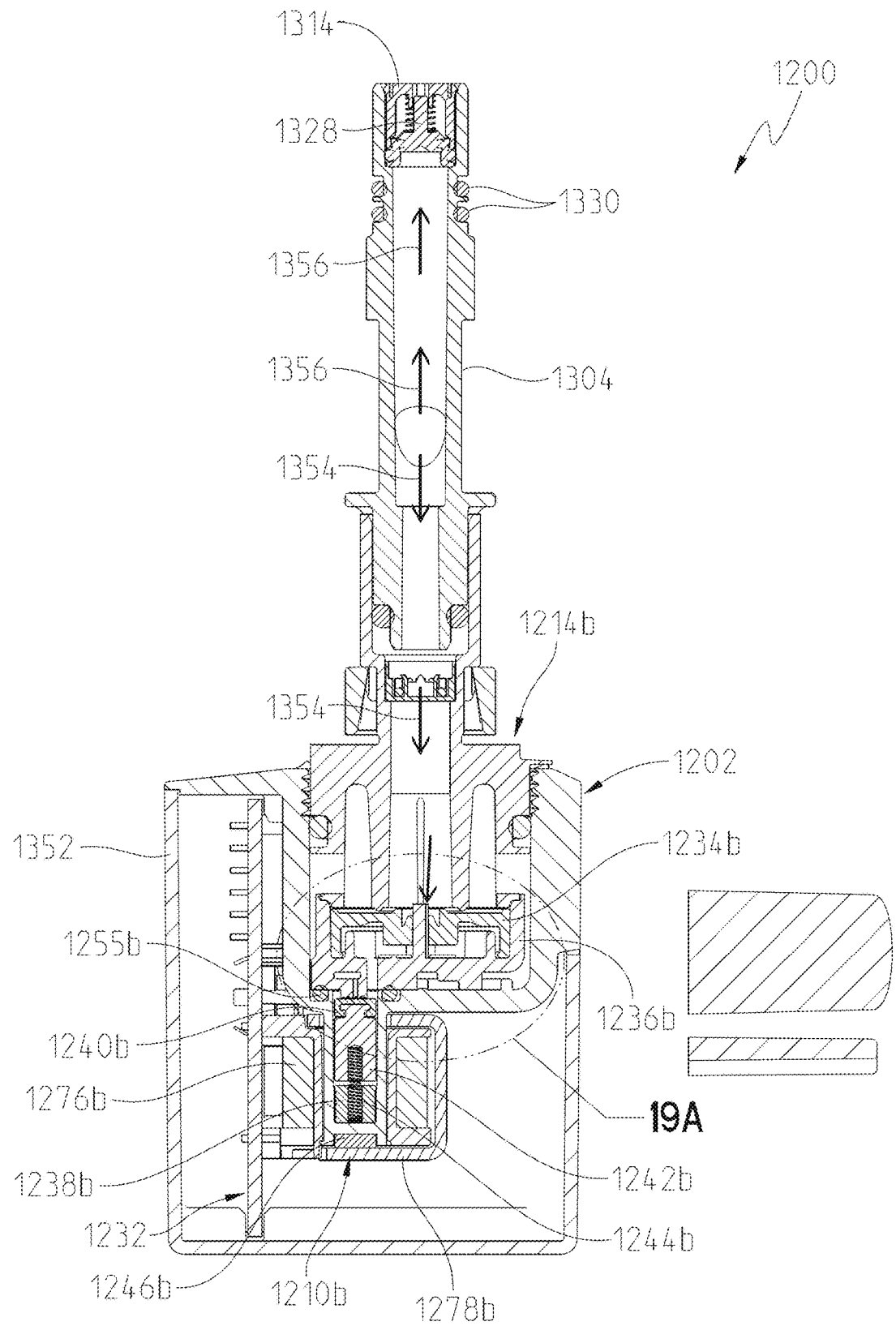
FIG. 19 is a cross-sectional view taken along line 19-19 of FIG. 16.
Figure 25:
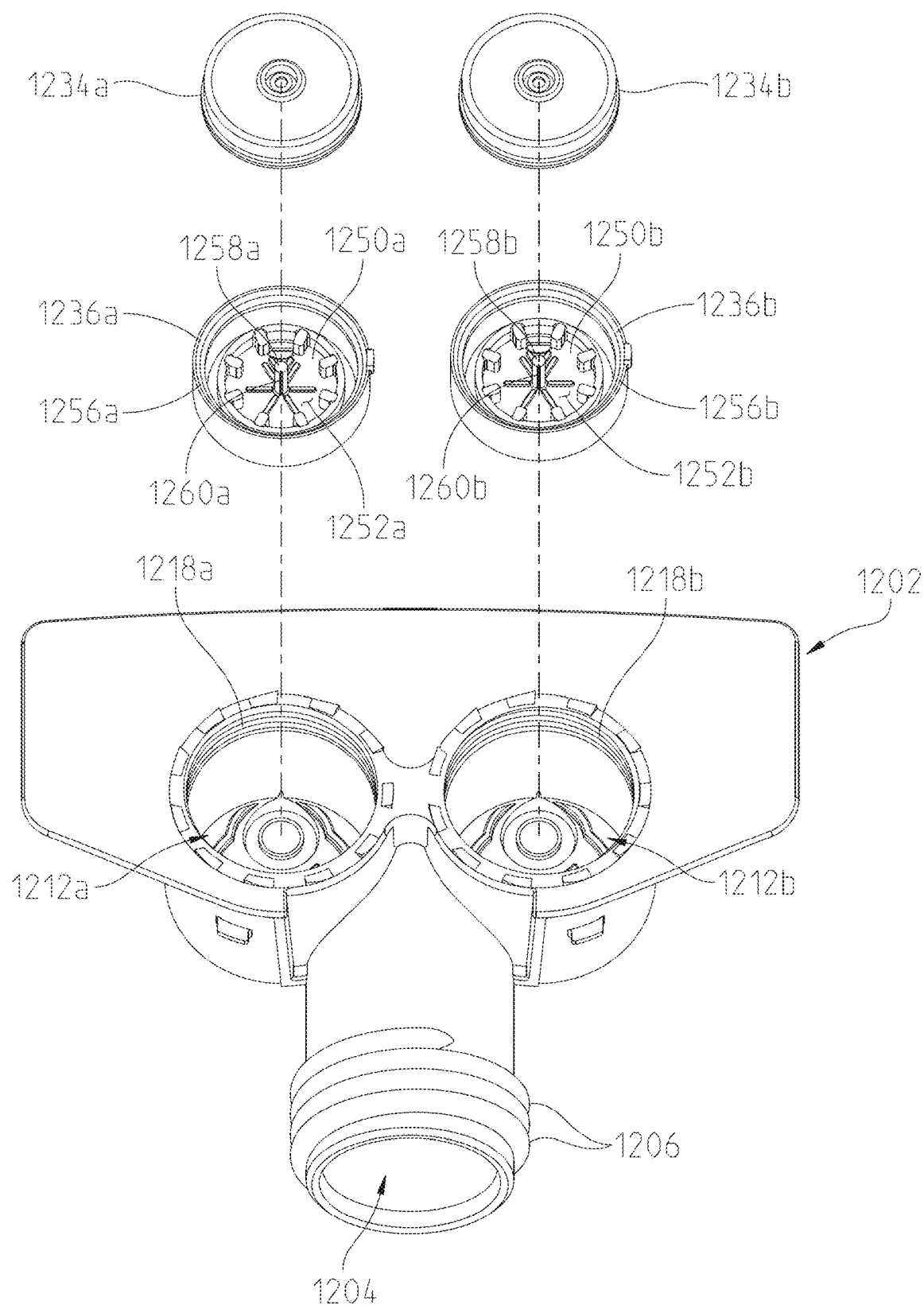
FIG. 25 is a first partially exploded perspective view of the system of FIG. 17.
Figure 26:
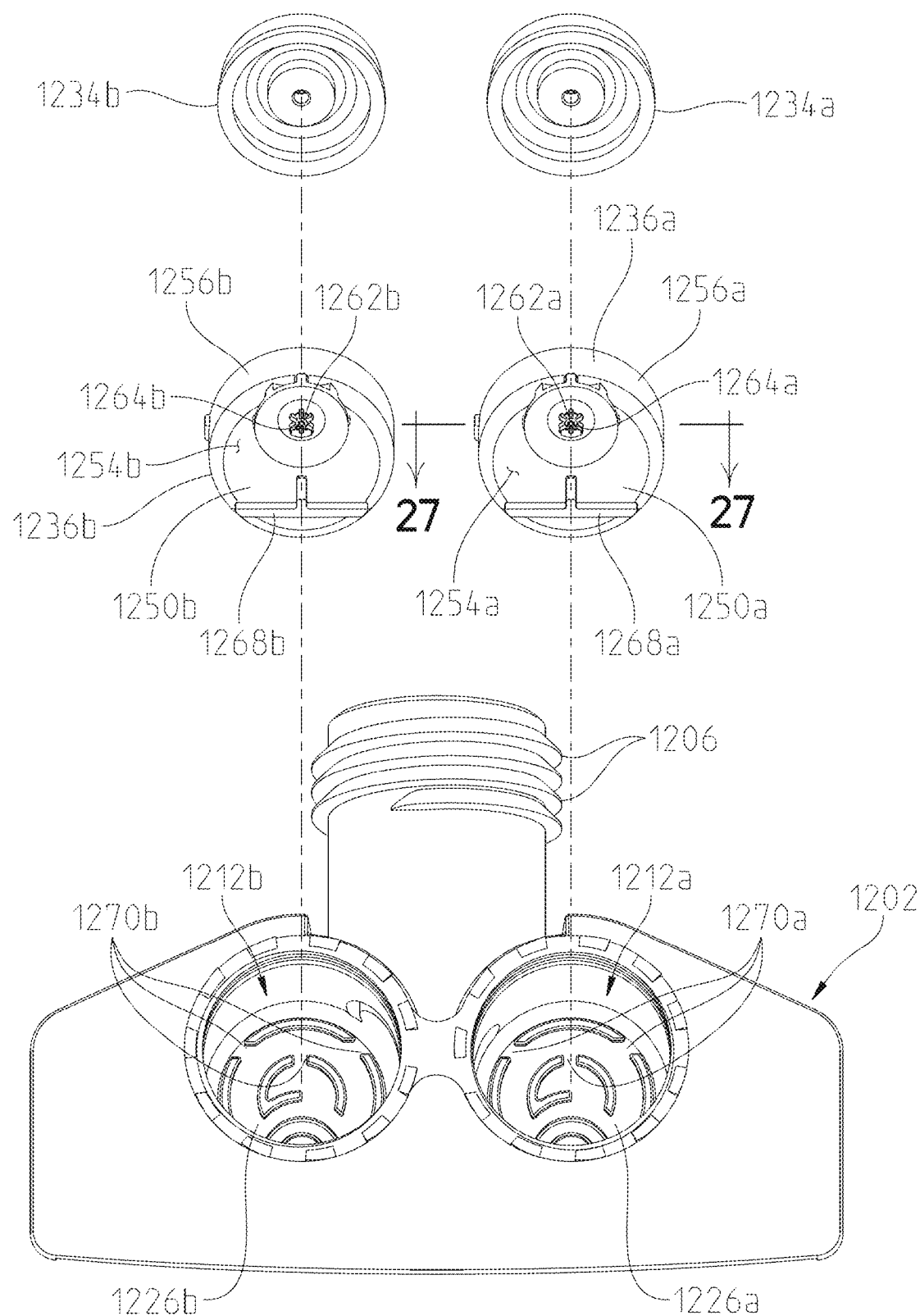
FIG. 26 is a second partially exploded perspective view of the system of FIG. 17.
Figure 27:
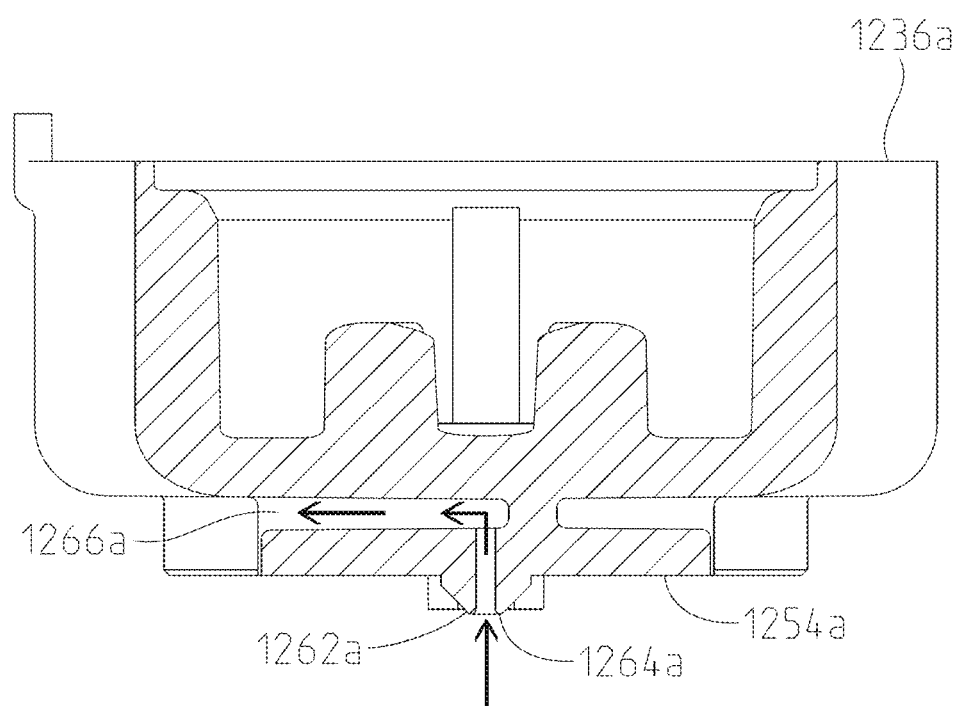
FIG. 27 is a side view, in partial cross-section, of the solenoid housing of FIG. 25.

With reference to FIGS. 18 and 19, a support, illustratively a printed circuit board 1232 supports the solenoid valves 1210a and 1210b. Each of the solenoid valves 1210a and 1210b are substantially identical and illustratively includes a main valve disc or diaphragm 1234a, 1234b, a diaphragm housing 1236a, 1236b, a solenoid pole 1238a, 1238b, a seal 1240a, 1240b, a solenoid armature 1242a, 1242b, a helical compression spring 1244a, 1244b, and a magnet 1246a, 1246b. The diaphragm housing 1236a, 1236b includes a base 1250a, 1250b having an upper surface 1252a, 1252b and a lower surface 1254a, 1254b. An o-ring 1255a, 1255b is positioned between the lower surface 1254a, 1254b of the diaphragm housing 1236a, 1236b and the base 1226a, 1226b of the valve receiving chamber 1212a, 1212b. As shown in FIGS. 25 and 26, a cylindrical side wall 1256a, 1256b extends upwardly from the upper surface 1252a, 1252b of the base 1250a, 1250b. A center post 1258a, 1258b extends upwardly from the upper surface 1252a, 1252b of the base 1250a, 1250b and includes an axial water slot 1260a, 1260b.

Referring now to FIGS. 19-19B, 26 and 27, a valve seat 1262a, 1262b is supported by the lower surface 1254a, 1254b of the base 1250a, 1250b. An opening 1264a, 1264b extends within the valve seat 1262a, 1262b and is in fluid communication with a lateral passageway 1266a, 1266b within the diaphragm housing 1236a, 1236b. A T-shaped protrusion 1268a, 1268b extends downwardly from the lower surface 1254a, 1254b of the base 1250a, 1250b and is received within locating slots 1270a, 1270b in the respective base 1226a, 1226b to orient and rotationally secure the diaphragm housing 1236a, 1236b relative to the receiving chamber 1212a, 1212b of the valve body 1202.

With reference to FIGS. 18 and 19, solenoid coils 1276a and 1276b and supporting brackets 1278a and 1278b are fixed to the printed circuit board 1232. As further detailed herein, activation of the solenoid coil 1276a, 1276b causes axial movement of the solenoid armature 1242a, 1242b and the seal 1240a, 1240b away from the valve seat 1262a, 1262b and opening 1264a, 1264b of the diaphragm housing 1236a, 1236b. Spring 1244a, 1244b biases the armature 1242a, 1242b and seal 1240a, 1240b into sealing engagement with the valve seat 1262a, 1262b to prevent fluid flow through opening 1264a, 1264b of the diaphragm housing 1236a, 1236b.

Figure 16:
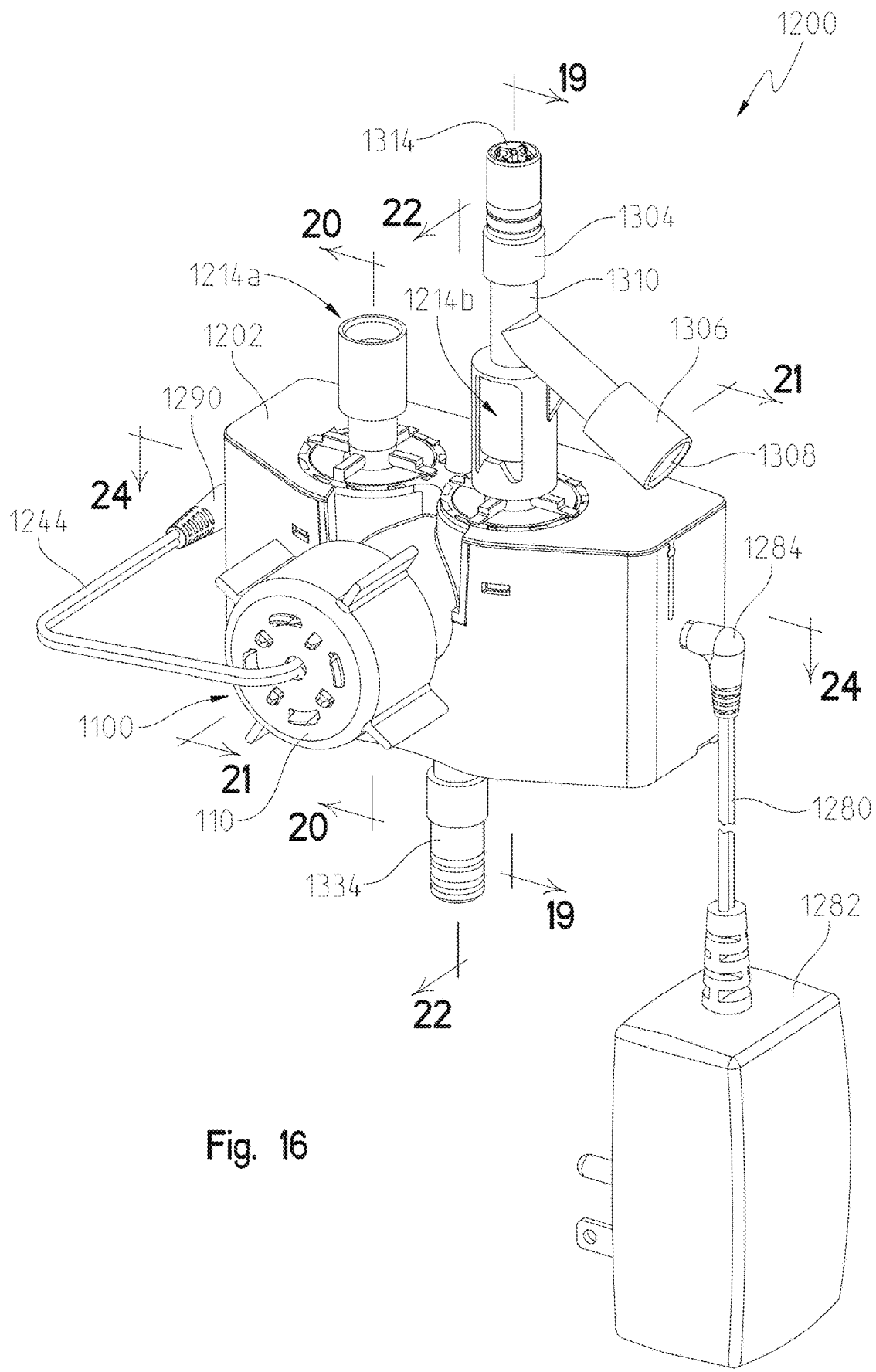
FIG. 16 is a right perspective view of an illustrative system including an ozone generator of the present disclosure.
Figure 17:
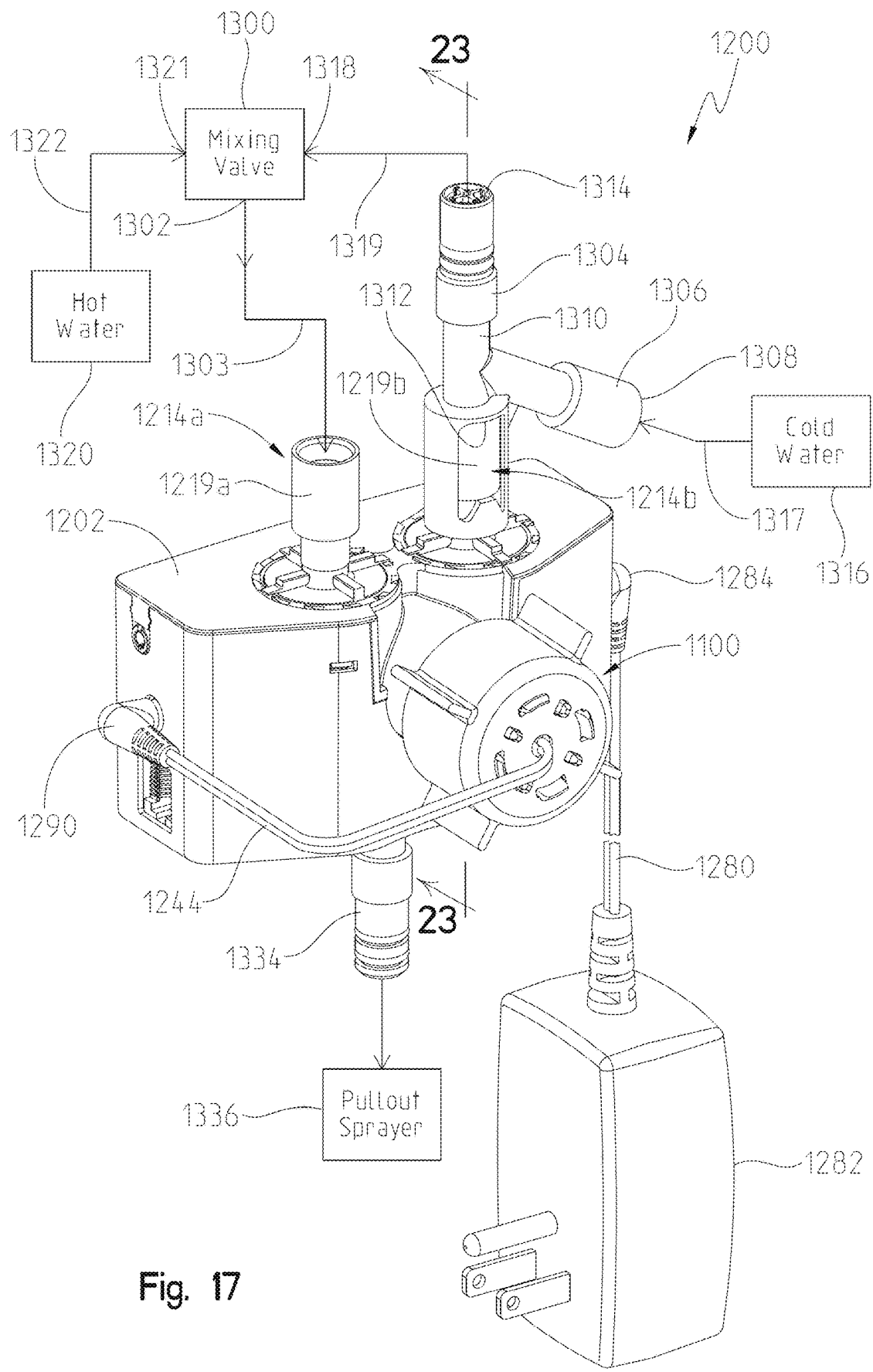
FIG. 17 is left perspective view of the illustrative system of FIG. 16.

With reference to FIGS. 16-18, a power supply (not shown) is illustratively electrically coupled to the printed circuit board 1232 through an electrical cable 1280 including a wall plug 1282 at a first end and a connector 1284 at a second end. The wall plug 1282 illustratively includes an AC to DC 24 volt switching power supply. The connector 1284 is received within a socket 1286 supported by the printed circuit board 1232. Electrical cable 1244 of the ozone generator 1100 includes a connector 1290 coupled to a socket 1292 supported by the printed circuit board 1232. A controller 1294 is illustratively supported by the printed circuit board 1232, and may include a constant current light emitting diode (LED) power integrated circuit (IC) chip. The IC chip is illustratively configured to maintain the current constant as the resistance of the ozone generator 1100 changes over its life (e.g., due to accumulation on and/or degradation of the electrodes).

Referring now to FIG. 17, a conventional mixing valve 1300 is illustratively in fluid communication with the first and second solenoid valves 1210a and 1210b. More particularly, an outlet 1302 of the mixing valve 1300 is fluidly coupled to the first solenoid valve 1210a through conventional fluid line 1303. More particularly, the fluid line 1303 is fluidly coupled to the connector tube 1219a of the inlet retainer 1214a. A wye fitting 1304 is fluidly coupled to the second retainer 1214b. The wye fitting 1304 includes an inlet tube 1306 including an inlet port 1308, and an outlet tube 1310 including a first outlet port 1312 and a second outlet port 1314. The inlet port 1308 of the inlet tube 1306 is illustratively fluidly coupled to a cold water source 1316 through a conventional fluid line 1317, the first outlet port 1312 of the outlet tube 1310 is illustratively fluidly coupled to the first solenoid valve 1210a through connector tube 1219b of the inlet retainer 1214b, and the second outlet port 1314 of the outlet tube 1310a is illustratively fluidly coupled to a cold water inlet 1318 of the mixing valve 1300 through a conventional fluid line 1319. A hot water source 1320 is fluidly coupled to a hot water inlet 1321 of the mixing valve 1300 through a conventional fluid line 1322.

A first screen filter 1324 is illustratively positioned within the inlet port 1308. A flow regulator or restrictor 1326 is illustratively positioned to regulate water flow through the first outlet port 1312 and sealed by an o-ring 1327. In one illustrative embodiment, the flow restrictor 1326 restricts flow to 0.5 gallons per minute (gpm). A check valve 1328 is positioned within the second outlet port 1314 to prevent backflow of water from the mixing valve 1300 to the second solenoid valve 1210b and sealed with o-rings 1330. A second screen filter 1332 is illustratively positioned within the connector tube 1219a of the inlet retainer 1214a.

An outlet fitting 1334 is fluidly coupled to the outlet passageway 1230 in the solenoid valve body 1202. A fluid delivery device, illustratively a conventional pullout wand 1336 is fluidly coupled to the outlet fitting 1334. O-rings 1338 are illustratively supported by the outlet fitting 1334. A water flow meter 1340, illustratively a flow turbine 1342 rotatably supported by flow meter bearings 1344 supported within the outlet fitting 1334. The flow turbine 1342 measures the water flow rate through the outlet fitting 1334 and is in electrical communication with a sensor 1345 supported on the printed circuit board 1232. The sensor 1345 provides a signal to the controller 1294 indicative of the measured water flow rate. In response, the controller 1294 may control the current supplied to the ozone generator 1100 and the resulting ozone concentration in the water exiting therefrom.

A rivet 1346, illustratively formed of an electrically conductive material (e.g., copper) is supported by the valve body 1202. The rivet 1346 includes a shaft 1348 sealed with an o-ring 1350 and in thermal communication with water flowing through the outlet passageway 1230. A temperature sensor, illustratively a thermistor 1351, is illustratively supported by the printed circuit board 1232 and is in electrical communication with the rivet 1346. The thermistor 1351 measures water temperature and provides a signal indicative thereof to the controller 1294. In response, the controller 1294 may control the current supplied to the ozone generator 1100 and the resulting ozone concentration in the water exiting therefrom.

A cover 1352 illustratively supports the solenoid valve body 1202 and the printed circuit board 1232. Illustratively, the fluid connector tubes 1219a, 1219b of the inlet housings 1214a, 1214b extend in a first direction (upwardly in FIGS. 16-18), and the outlet fitting 1330 extends in a second direction (downwardly in FIGS. 16-18).

An illustrative operation of the ozone system 1200 is further detailed below in connection with FIGS. 18-24. In the following description, reference to the illustrative operation will be with the ozone system 1200 oriented such that the outlet fitting 1330 extends vertically downwardly and the ozone generator 1100 extends horizontally forwardly. It should be appreciated that orientation of the ozone system 1200 may vary.

The first and second pilot operated diaphragm solenoid valves 1210a and 1210b are illustratively positioned side by side. The first (or ozone) solenoid valve 1210a (illustratively on the right) is used to control the flow of cold water for the ozone generator 1100. The second (or mixed water) solenoid valve 1210b (illustratively on the left) controls the flow of mixed water from the faucet mixing valve 1290 for normal operation of the faucet 1000 (for example, through capacitive touch operation of the faucet 1000).

Cold water enters into the wye fitting 1304 through the inlet port 1308 (on the far right in FIG. 17) and passes through screen filter 1324 to remove debris. The cold water splits, either going down through the first outlet port 1312 and to the second solenoid 1210b (represented by arrows 1354 in FIG. 19), or up through the second outlet port 1314 and to the cold water inlet for the faucet mixing valve 1300 (represented by arrows 1356 in FIG. 19). The cold water going to mixing valve 1300 passes through check valve 1328 that prevents hot water, which may be at a higher pressure than the cold water, from traveling backwards through faucet mixing valve 1300 and entering the ozone solenoid valve 1210b. Before the water enters the ozone solenoid valve 1210a, it passes through pressure compensating flow restrictor 1326 that illustratively limits the ozone water flow to 0.5 gpm. This relatively low flow allows the ozone generator 1100 to achieve a desired ozone concentration in the discharged water.

Figure 19A:
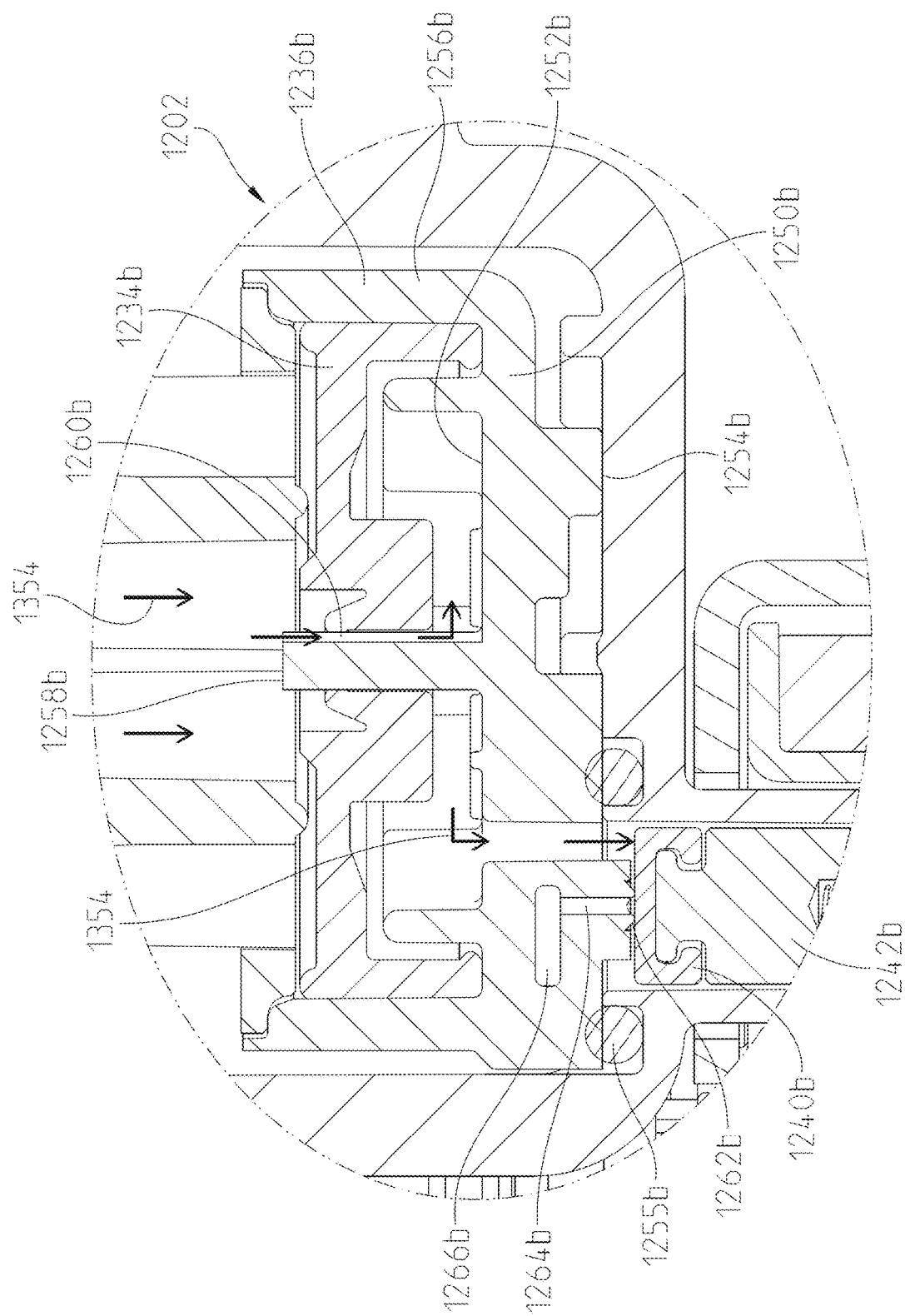
FIG. 19A is detail view of FIG. 19, showing the cold water solenoid valve in a closed position.
Figure 19B:
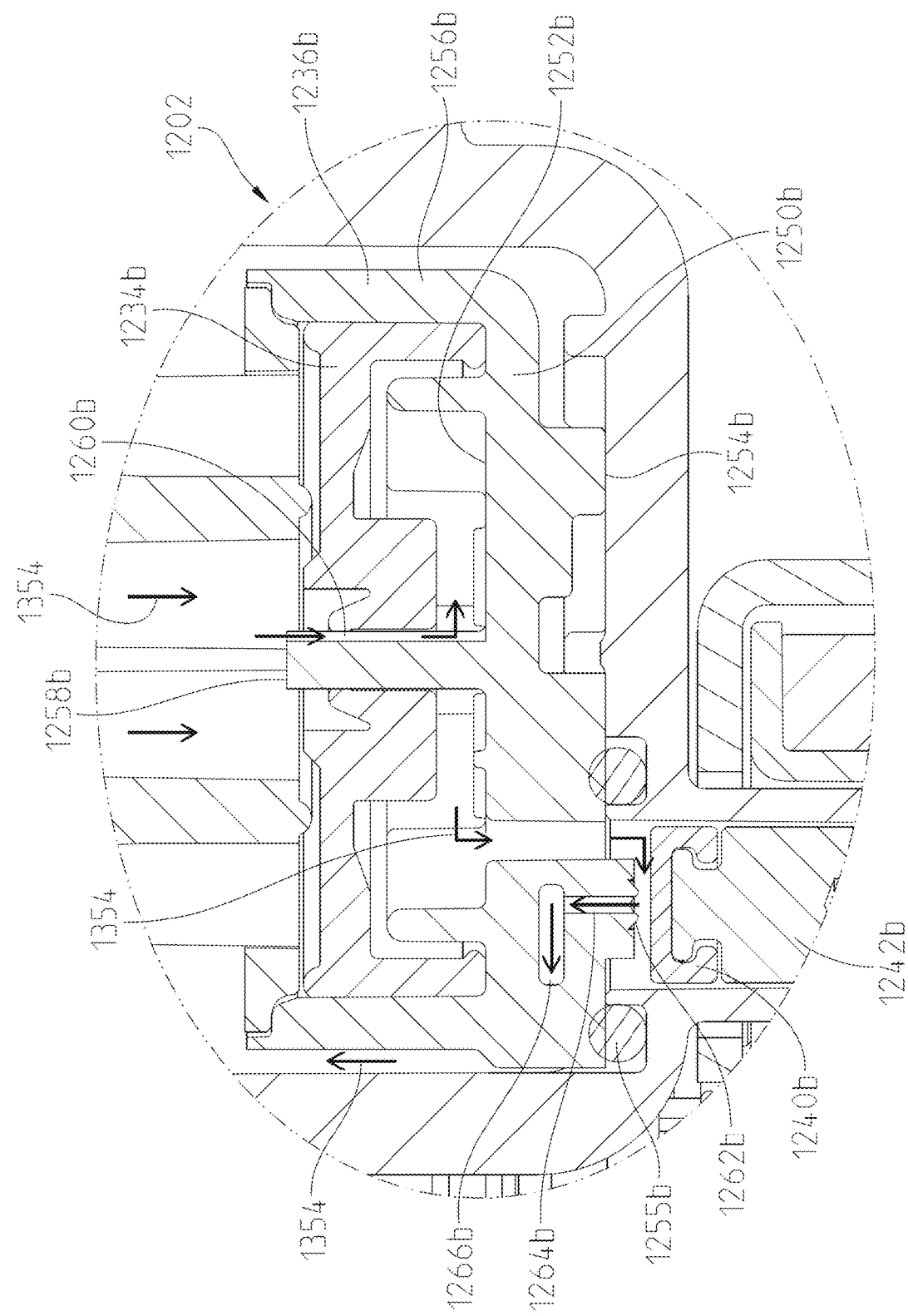
FIG. 19B is a detail view of FIG. 19, showing the cold water solenoid valve in an open position.

FIG. 19A illustrates the second solenoid valve 1210b in a closed position, where the seal 1240b contacts the valve seat 1262b and prevents water flow to the ozone generator 1100. FIG. 19B illustrates the second solenoid valve 1210b in an open position, where the seal 1240b is spaced apart from the valve seat 1262b such that water flows to the ozone generator 1100. More particularly, after the ozone solenoid valve 1210b is opened by the coil 1276b on the printed circuit board 1232, water flows along slot 1260b of post 1258b, through an opening 1347 between the seal 1240b and the valve seat 1262b, out of the ozone solenoid valve 1210b via slot 1228b in the valve receiving chamber 1212b, and then passes around the periphery of the ozone generator 1100 (represented by arrows 1354 in FIGS. 19B-21 and 24). As represented by arrows 1354 in FIG. 24, the water flow through the ozone generator 1100 is parallel to the longitudinal axis L.

After water passes over the diamond electrodes 160, it exits though center opening 1358 of the ozone generator 1100. As may be appreciated, the water flow through the ozone generator 1100 is parallel to the longitudinal axis L. After exiting the ozone generator 1100, the water path is common for either ozone water flow or normal mixed water flow (where water flow is represented by arrows 1360 in FIGS. 21 and 24).

In the outlet passageway 1230, water then passes by the copper rivet 1346, which is used to transfer heat to the thermistor 1351 mounted on the printed circuit board 1232, which in turn, measures the water temperature. The thermistor 1351 provides a signal indicative of the measured water temperature to the controller. Finally, the water passes through the water flow turbine 1342 which measures the flow rate via sensor 1345 mounted on the printed circuit board 1232 that detects the changing field of the magnetic flow turbine 1342. The sensor 1345 provides a signal indicative of the measured flow rate to the controller 1294. The controller 1294 may vary the power supplied to the ozone generator 1100 based on the temperature and/or flow rate of the water, thereby altering the amount of ozone generated.

Figure 20:
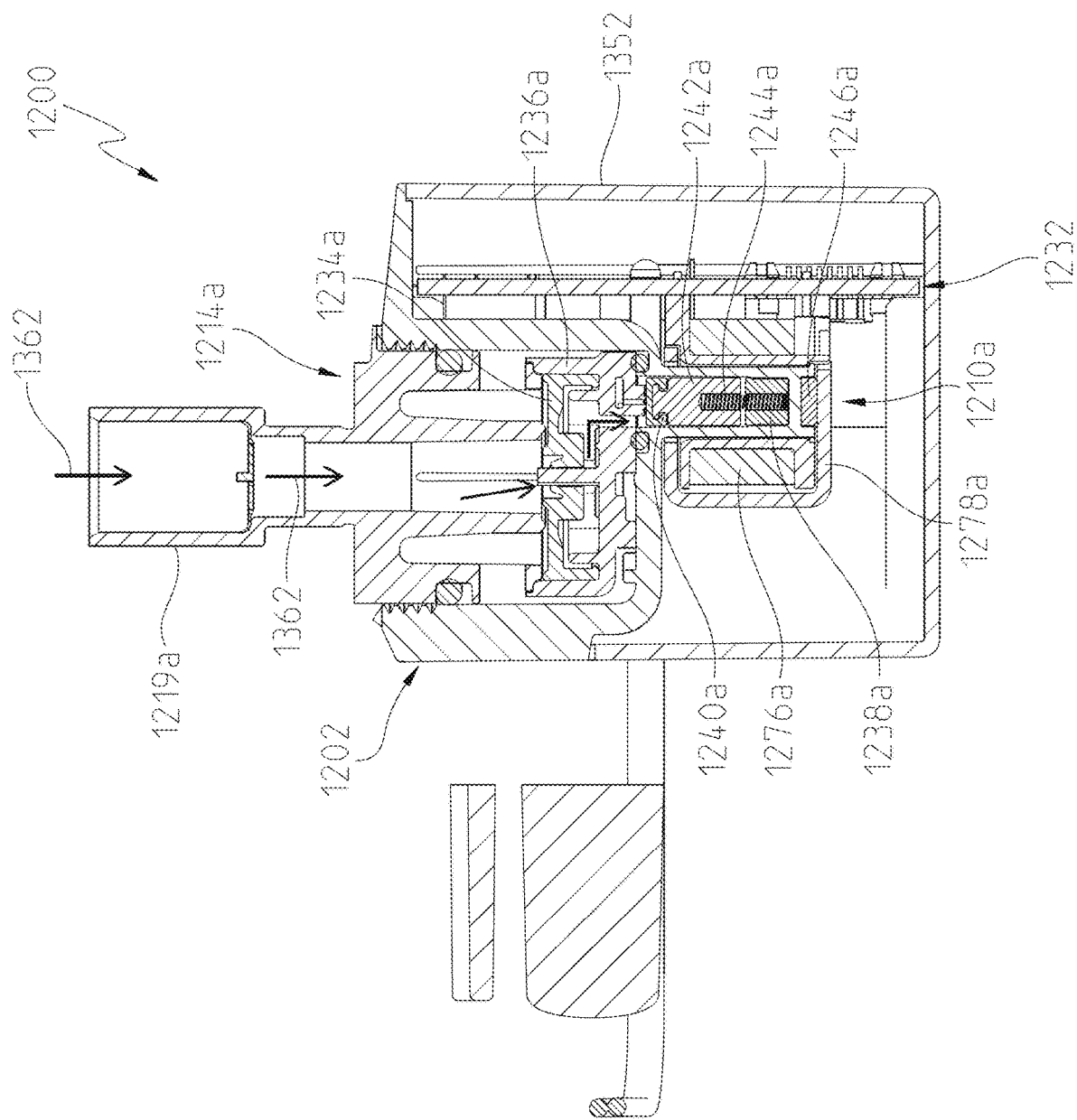
FIG. 20 is a cross-sectional view taken along line 20-20 of FIG. 16.

The hot and cold water from the hot and cold water fluid lines 1319 and 1322 are combined in faucet mixing valve 1300 and enter into the first (left) solenoid valve 1210*a* through the inlet housing 1214*a* (where water flow is represented by arrows 1362 in FIGS. 20, 23 and 24). Screen filter 1332 removes debris. It should be appreciated that operation of the first solenoid valve 1210*a* is similar to the second solenoid valve 1210*b*. More particularly, the first solenoid valve 1210*a* opens and closes via coil 1276*a* on the printed circuit board 1232. The water exits the first solenoid valve 1210*a* via slot 1228*a* in the valve receiving chamber 1212*a* and enters the common outlet passageway 1230 with the ozone water from the ozone generator 1100. The mixed water (from the mixing valve 1300) passes by the same copper rivet 1346 and magnetic flow meter 1340 as the ozone water (from the ozone generator 1100), allowing the measurement of water temperature and flow.

Illustratively, the ozone generator 1100 has current supplied to the diamond electrodes 160 via titanium wire current spreaders 1140. These current spreaders 1140 are illustratively flattened to allow for good contact with the electrode 160. The wire of the current spreaders 1140 transitions to a round section 1142 that allows the use of an o-ring 134 to seal the water inside the ozone generator 1100.

The current spreader 1140 is illustratively connected to the wire harness 1144 via connector 1145 and wire harness plugs into the printed circuit board 1232 via a coaxial power connector. Power is supplied to the printed circuit board 1232 by an AC to DC 24 switching power supply. The 24 volt power is directed through a constant current LED power IC chip. The IC chip holds the current constant as the resistance of the ozone generator 100 changes over the life of the ozone generator 1100. The IC chip also has the ability to increase or decrease the constant current level supplied to the ozone generator 1100 based on the temperature of the water, which affects the amount of ozone that can be generated.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ozone generator for use with a faucet, the ozone generator comprising:
   an outer cartridge;
   an electrolytic cell assembly received within the outer cartridge, the electrolytic cell assembly comprising:
   a first housing;
   an anode coupled to the first housing;
   a second housing;
   a cathode coupled to the second housing;
   a separator positioned between the anode and the cathode, the separator comprising a proton exchange membrane;
   a holder that couples the first housing to the second housing independently of the outer cartridge;
   a first end cap secured to an end of the outer cartridge, wherein water is configured to flow through the first end cap;
   a second end cap secured to an opposing end of the outer cartridge; and
   wire leads extending through the second end cap.

2. The ozone generator of claim 1, wherein the separator has a thickness of about 20-30 microns.

3. The ozone generator of claim 2, wherein the separator has a thickness of about 25 microns.

4. The ozone generator of claim 1, wherein the anode and the cathode each comprises an underlayer of boron-doped silicon and a coating of boron-doped diamond.

5. The ozone generator of claim 4, wherein the underlayer has a thickness of about 400-600 microns.

6. The ozone generator of claim 4, wherein the coating has a thickness of about 3-8 microns.

7. The ozone generator of claim 1, wherein the holder comprises at least one sealing ring around the first and second housings.

8. An ozone generator for use with a faucet, the ozone generator comprising:
   an outer cartridge;
   an electrolytic cell assembly received within the outer cartridge, the electrolytic cell assembly comprising:
   a first housing;
   an anode coupled to the first housing;
   a second housing;
   a cathode coupled to the second housing;
   a separator positioned between the anode and the cathode; and
   a holder that couples the first housing to the second housing independently of the outer cartridge;
   wherein:
   the first housing and the outer cartridge cooperate to define a first water flow path across the anode; and
   the second housing and the outer cartridge cooperate to define a second water flow path across the cathode.

9. The ozone generator of claim 1, further comprising a first current spreader positioned intermediate the first housing and the anode, and a second current spreader positioned intermediate the second housing and the cathode.

10. The ozone generator of claim 9, wherein each of the first current spreader and the second current spreader includes a rectangular body and a terminal configured to be in electrical communication with a wire lead, the rectangular body of the first current spreader being overmolded with the first housing, and the rectangular body of the second current spreader being overmolded with the second housing.

11. The ozone generator of claim 9, wherein each of the first current spreader and the second current spreader includes a rectangular body and a terminal configured to be in electrical communication with a wire lead, each terminal having a round cross-section and an o-ring received on the terminal.

12. An ozone generator for use with a faucet, the ozone generator comprising:
   an outer cartridge;
   an electrolytic cell received within the outer cartridge, the electrolytic cell assembly including:
   a first housing;
   a first current spreader overmolded by the first housing;
   an anode in electrical communication with the first current spreader;
   a second housing;

a second current spreader overmolded by the second housing, a cathode in electrical communication with the second current spreader; and a separator between the anode and the cathode, the separator comprising a proton exchange membrane.

13. The ozone generator of claim 12, wherein the anode and the cathode each comprises a plurality of water passageways.

14. The ozone generator of claim 12, wherein the water passageways are formed by deep reactive ion etching.

15. The ozone generator of claim 12, wherein the first housing and the second housing are identical in construction.

16. The ozone generator of claim 12, further comprising a first frame that receives the anode and a second frame that receives the cathode, wherein the first frame and the second frame are identical in construction.

17. An ozone generator for use with a faucet, the ozone generator comprising:
an outer cartridge;
an electrolytic cell received within the outer cartridge, the electrolytic cell assembly including:
a first housing;
a first current spreader overmolded by the first housing,
an anode in electrical communication with the first current spreader;
a second housing;
a second current spreader overmolded by the second housing,
a cathode in electrical communication with the second current spreader; and
a separator between the anode and the cathode;
wherein:
the first current spreader includes a first terminal and a first opening that receives the anode, the first housing surrounding the first current spreader in a sealed manner between the first terminal and the first opening; and
the second current spreader includes a second terminal and a second opening that receives the cathode, the second housing surrounding the second current spreader in a sealed manner between the second terminal and the second opening.

18. The ozone generator of claim 17, wherein the first terminal includes tabs configured to be crimped on a first wire lead, and the second terminal includes tabs configured to be crimped on a second wire lead.

19. An ozone generator system for use with a faucet, the ozone generator system comprising:
a mixing valve having a cold water inlet fluidly coupled to a cold water source, a hot water inlet fluidly coupled to a hot water source, and an outlet in selective fluid communication with the cold water inlet and the hot water inlet;
a valve body including a first valve receiving chamber, a second valve receiving chamber, an ozone generator receiving chamber, and an outlet passageway;
an ozone generator received within the ozone generator receiving chamber, and an electrolytic cell assembly received within the outer cartridge;
a first electrically operable valve received within the first valve receiving chamber and configured to control water flow from the outlet of the mixing valve to the outlet passageway of the valve body; and a second electrically operable valve received within the second valve receiving chamber and configured to control water flow from the cold water source to the ozone generator;
wherein the electrolytic cell assembly includes:
a first housing;
an anode coupled to the first housing;
a second housing;
a cathode coupled to the second housing;
a separator positioned between the anode and the cathode, the separator comprising a proton exchange membrane; and
a holder that couples the first housing to the second housing independently of the outer cartridge.

20. An ozone generator system for use with a faucet, the ozone generator system comprising:
a mixing valve having a cold water inlet fluidly coupled to a cold water source, a hot water inlet fluidly coupled to a hot water source, and an outlet in selective fluid communication with the cold water inlet and the hot water inlet;
a valve body including a first valve receiving chamber, a second valve receiving chamber, an ozone generator receiving chamber, and an outlet passageway;
an ozone generator received within the ozone generator receiving chamber;
a first electrically operable valve received within the first valve receiving chamber and configured to control water flow from the outlet of the mixing valve to the outlet passageway of the valve body;
a second electrically operable valve received within the second valve receiving chamber and configured to control water flow from the cold water source to the ozone generator;
wherein the first electrically operable valve is a first pilot operated diaphragm solenoid valve, and the second electrically operable valve is a second pilot operated diaphragm solenoid valve; and
a printed circuit board supported by the valve body, wherein the first pilot operated diaphragm solenoid valve includes a first solenoid armature supporting a seal movable by activation of a first solenoid coil coupled to the printed circuit board, and the second pilot operated diaphragm solenoid valve includes a second solenoid armature supporting a seal movable by activation of a second solenoid coil coupled to the printed circuit board.

21. The ozone generator system of claim 19, wherein the ozone generator includes:
a first housing;
a first current spreader overmolded by the first housing;
an anode in electrical communication with the first current spreader;
a second housing;
a second current spreader overmolded by the second housing;
a cathode in electrical communication with the second current spreader; and
a separator between the anode and the cathode.

22. The ozone generator system of claim 19, further comprising a wye fitting including an inlet in fluid communication with the cold water source, a first outlet in fluid communication with the cold water inlet of the mixing valve, and a second outlet in fluid communication with the second electrically operable valve.

23. The ozone generator system of claim 19, further comprising a pullout wand in fluid communication with the outlet passageway of the valve body.

24. The ozone generator system of claim 21, wherein the ozone generator further includes an outer cartridge, and a holder that couples the first housing to the second housing independently of the outer cartridge.

25. The ozone generator system of claim 24, wherein the holder comprises at least one sealing ring around the first and second housings.

26. The ozone generator system of claim 24, wherein:
the first housing and the outer cartridge cooperate to define a first water flow path across the anode; and
the second housing and the outer cartridge cooperate to define a second water flow path across the cathode.

27. The ozone generator system of claim 21, wherein the anode and the cathode each comprises an underlayer of boron-doped silicon and a coating of boron-doped diamond.

28. The ozone generator system of claim 21, wherein each of the first current spreader and the second current spreader includes a rectangular body and a terminal configured to be in electrical communication with a wire lead, the rectangular body of the first current spreader being overmolded with the first housing, and the rectangular body of the second current spreader being overmolded with the second housing.

29. The ozone generator system of claim 21, wherein each of the first current spreader and the second current spreader includes a rectangular body and a terminal configured to be in electrical communication with a wire lead, each terminal having a round cross-section and an o-ring received on the terminal.

30. The ozone generator of claim 1, wherein the separator is constructed from a solid polymer electrolyte membrane.

31. The ozone generator system of claim 19, further comprising a printed circuit board supported by the valve body, wherein the first solenoid valve, the first solenoid coil, the second solenoid valve, and the second solenoid coil are coupled to the printed circuit board.

* * * * *